(12) United States Patent
Morris

(10) Patent No.: US 9,028,679 B2
(45) Date of Patent: May 12, 2015

(54) METHOD AND SYSTEM FOR REMOVING HYDROGEN SULFIDE FROM SOUR OIL AND SOUR WATER

(71) Applicant: Anschutz Exploration Corporation, Denver, CO (US)

(72) Inventor: Jeff Blair Morris, Evanston, WY (US)

(73) Assignee: Anschutz Exploration Corporation, Denver, CO (US)

( * ) Notice: Subject to any disclaimer, the term of this patent is extended or adjusted under 35 U.S.C. 154(b) by 0 days.

(21) Appl. No.: 14/185,006

(22) Filed: Feb. 20, 2014

(65) Prior Publication Data

US 2014/0238902 A1    Aug. 28, 2014

Related U.S. Application Data

(60) Provisional application No. 61/768,029, filed on Feb. 22, 2013.

(51) Int. Cl.
*C10G 31/08* (2006.01)
*B01D 19/00* (2006.01)
(Continued)

(52) U.S. Cl.
CPC ............ *B01D 19/0005* (2013.01); *C02F 1/20* (2013.01); *C10G 21/16* (2013.01); *C10G 31/08* (2013.01); *C10G 21/30* (2013.01); *C02F 2101/101* (2013.01); *C02F 2209/26* (2013.01);
(Continued)

(58) Field of Classification Search
CPC ............ C10G 2300/805; C10G 2300/20; C10G 2300/40; C10G 21/00; C10G 21/30; C10G 17/00; C10G 31/08

USPC ........................................ 208/208 R
See application file for complete search history.

(56) References Cited

U.S. PATENT DOCUMENTS 3,387,431 A * 6/1968 Siebert .......................... 95/136
3,547,190 A   12/1970 Wilkerson
(Continued)

FOREIGN PATENT DOCUMENTS

CN    101532380    9/2009
EP      2495219    9/2012
(Continued)

OTHER PUBLICATIONS

"Sulfuro de Hidrógeno," (no English translation available), EcuRed: Encliclopedia cubana, Nov. 1, 2011 [retrieved on Apr. 11, 2014], 6 pages. Retrieved from: www.ecured.cu/index.php?title=Sulfuro_de_Hidr%C3%B3geno&oldid=1103062.
(Continued)

*Primary Examiner* — Michelle Stein
(74) *Attorney, Agent, or Firm* — Sheridan Ross P.C.

(57) ABSTRACT

Embodiments of the present invention are generally related to a system and method to remove hydrogen sulfide from sour water and sour oil. In particular, hydrogen sulfide is removed from sour water and sour oil without the need for special chemicals, such as catalyst chemicals, scavenger chemicals, hydrocarbon sources, or a large scale facility. The system and method in the present invention is particularly useful in exploratory oil and gas fields, where large facilities to remove hydrogen sulfide may be inaccessible. The present invention addresses the need for safe and cost effective transport of the deadly neurotoxin. Particular embodiments involve a system and method that can be executed both on a small and large scale to sweeten sour water and sour oil.

22 Claims, 5 Drawing Sheets

(51) Int. Cl.
*C02F 1/20* (2006.01)
*C10G 21/16* (2006.01)
*C10G 21/30* (2006.01)
*C02F 101/10* (2006.01)

(52) U.S. Cl.
CPC ..... *C02F2209/265* (2013.01); *C10G 2300/207* (2013.01); *C10G 2300/4068* (2013.01); *C02F 2209/005* (2013.01)

(56) References Cited

U.S. PATENT DOCUMENTS

| | | | |
|---|---|---|---|
| 3,583,901 A * | 6/1971 | Piehl | 208/47 |
| 3,618,667 A | 11/1971 | Snavely, Jr. | |
| 3,844,942 A | 10/1974 | Barber | |
| 3,913,673 A | 10/1975 | Barber | |
| 3,969,106 A | 7/1976 | Wark | |
| 3,977,972 A | 8/1976 | Bloch et al. | |
| 3,984,316 A | 10/1976 | Worrall et al. | |
| 3,997,437 A | 12/1976 | Prince et al. | |
| 4,011,304 A | 3/1977 | Mancini et al. | |
| 4,013,779 A | 3/1977 | Haese | |
| 4,051,016 A | 9/1977 | Metrailer et al. | |
| 4,076,621 A | 2/1978 | Hardison | |
| 4,208,384 A | 6/1980 | Mitchell | |
| 4,218,309 A | 8/1980 | Compton | |
| 4,253,928 A | 3/1981 | Blytas et al. | |
| 4,324,776 A | 4/1982 | Kim | |
| 4,370,236 A | 1/1983 | Ferguson | |
| 4,384,956 A | 5/1983 | Mulder | |
| 4,402,713 A | 9/1983 | Domahidy | |
| 4,410,432 A | 10/1983 | Domahidy | |
| 4,412,924 A | 11/1983 | Feather | |
| 4,414,103 A | 11/1983 | Farrell | |
| 4,414,817 A | 11/1983 | Jernigan | |
| 4,444,259 A | 4/1984 | Schwall | |
| 4,447,330 A | 5/1984 | Babineaux, III | |
| 4,452,699 A | 6/1984 | Suzuki et al. | |
| 4,468,929 A | 9/1984 | Jernigan | |
| 4,473,541 A | 9/1984 | Palm | |
| 4,528,817 A | 7/1985 | Jernigan | |
| 4,536,293 A | 8/1985 | Babineaux, III | |
| 4,537,605 A | 8/1985 | Gouw | |
| 4,784,775 A | 11/1988 | Hardison | |
| 4,816,158 A | 3/1989 | Shimura et al. | |
| 4,874,589 A | 10/1989 | Gorlich | |
| 4,925,569 A | 5/1990 | Chou et al. | |
| 4,976,935 A | 12/1990 | Lynn | |
| 4,992,078 A | 2/1991 | Meszaros | |
| 4,992,181 A | 2/1991 | Siebert | |
| 5,006,240 A | 4/1991 | Steffero, Sr. | |
| 5,015,370 A | 5/1991 | Fricano | |
| 5,057,292 A | 10/1991 | Monticelli, Jr. | |
| 5,071,574 A | 12/1991 | Pou | |
| 5,073,310 A | 12/1991 | Ramsey | |
| 5,089,246 A | 2/1992 | Schatz | |
| 5,096,580 A | 3/1992 | Auchincloss | |
| 5,141,647 A | 8/1992 | Bhadra | |
| 5,286,389 A | 2/1994 | Hardison | |
| 5,296,205 A | 3/1994 | Hardison | |
| 5,340,484 A | 8/1994 | Prince et al. | |
| 5,348,573 A * | 9/1994 | Tomassian et al. | 96/151 |
| 5,350,516 A | 9/1994 | Bhadra | |
| 5,362,181 A | 11/1994 | DenBesten | |
| 5,405,531 A | 4/1995 | Hitzman et al. | |
| 5,730,784 A | 3/1998 | Smith et al. | |
| 5,744,040 A | 4/1998 | Slates et al. | |
| 5,750,392 A | 5/1998 | Hitzman et al. | |
| 5,788,843 A | 8/1998 | Larrabee, Jr. et al. | |
| 5,858,206 A | 1/1999 | Castillo | |
| 6,074,562 A | 6/2000 | Falkner | |
| 6,103,108 A | 8/2000 | Kohlenberg | |
| 6,153,108 A | 11/2000 | Klock et al. | |
| 6,325,943 B1 | 12/2001 | Kohlenberg | |
| 6,352,680 B1 | 3/2002 | Watson et al. | |
| 6,444,117 B1 | 9/2002 | Khan et al. | |
| 6,495,029 B1 | 12/2002 | Schorfheide et al. | |
| 6,596,914 B2 | 7/2003 | Gore et al. | |
| 6,623,627 B1 | 9/2003 | Zhou | |
| 6,673,230 B2 | 1/2004 | Hagen et al. | |
| 6,692,635 B2 | 2/2004 | Didillon et al. | |
| 6,736,962 B2 | 5/2004 | Cook et al. | |
| 6,773,582 B2 | 8/2004 | Anthony | |
| 6,773,595 B2 | 8/2004 | Gantzer | |
| 6,780,392 B2 | 8/2004 | Gross et al. | |
| 6,808,639 B2 | 10/2004 | Rawson et al. | |
| 6,827,845 B2 | 12/2004 | Gong et al. | |
| 6,881,325 B2 | 4/2005 | Morris et al. | |
| 6,960,291 B2 | 11/2005 | Greaney et al. | |
| 6,994,491 B2 | 2/2006 | Kittle | |
| 7,005,058 B1 | 2/2006 | Towler | |
| 7,014,751 B2 | 3/2006 | Greaney et al. | |
| 7,029,573 B2 | 4/2006 | Greaney et al. | |
| 7,097,760 B1 | 8/2006 | Kalnes et al. | |
| 7,100,683 B2 | 9/2006 | Heilmann et al. | |
| 7,204,967 B2 | 4/2007 | Bierle et al. | |
| 7,232,848 B2 | 6/2007 | Mohedas et al. | |
| 7,244,352 B2 | 7/2007 | Halbert et al. | |
| 7,252,756 B2 | 8/2007 | Gong et al. | |
| 7,258,848 B1 | 8/2007 | Blackwell et al. | |
| 7,279,104 B2 | 10/2007 | Keeton, Jr. | |
| 7,282,081 B2 | 10/2007 | Verscharen | |
| 7,309,416 B2 | 12/2007 | Fokema et al. | |
| 7,351,330 B1 | 4/2008 | Fader et al. | |
| 7,390,470 B2 | 6/2008 | Anderson et al. | |
| 7,419,582 B1 | 9/2008 | Hoehn et al. | |
| 7,419,586 B2 | 9/2008 | Ellis et al. | |
| 7,431,822 B2 | 10/2008 | Farshid et al. | |
| 7,431,823 B2 | 10/2008 | Farshid et al. | |
| 7,431,827 B2 | 10/2008 | Rock et al. | |
| 7,431,831 B2 | 10/2008 | Farshid et al. | |
| 7,449,102 B2 | 11/2008 | Kalnes | |
| 7,470,358 B1 | 12/2008 | Kalnes | |
| 7,507,325 B2 | 3/2009 | Gueret et al. | |
| 7,507,328 B2 | 3/2009 | Ellis et al. | |
| 7,537,643 B2 | 5/2009 | Neylon et al. | |
| 7,547,386 B1 | 6/2009 | Thakkar et al. | |
| 7,575,732 B2 | 8/2009 | Anderson et al. | |
| 7,591,940 B2 | 9/2009 | Kalnes | |
| 7,650,938 B2 | 1/2010 | Hall et al. | |
| 7,678,263 B2 | 3/2010 | Mock | |
| 7,678,264 B2 | 3/2010 | Bhan | |
| 7,695,701 B2 | 4/2010 | Tekie et al. | |
| 7,744,749 B2 | 6/2010 | Martinie et al. | |
| 7,790,018 B2 | 9/2010 | Khan | |
| 7,794,585 B2 | 9/2010 | Leonard et al. | |
| 7,799,208 B2 | 9/2010 | Kokayeff et al. | |
| 7,803,267 B2 | 9/2010 | Chester et al. | |
| 7,803,979 B2 | 9/2010 | Gray et al. | |
| 7,807,046 B2 | 10/2010 | Bhan et al. | |
| 7,837,965 B2 | 11/2010 | Anderson | |
| 7,842,180 B1 | 11/2010 | Leonard et al. | |
| 7,842,181 B2 | 11/2010 | Choi | |
| 7,857,964 B2 | 12/2010 | Mashiko et al. | |
| 7,858,834 B2 | 12/2010 | Powers | |
| 7,879,223 B2 | 2/2011 | Wellington et al. | |
| 7,883,618 B2 | 2/2011 | Claude et al. | |
| 7,897,133 B1 | 3/2011 | Hojjatie et al. | |
| 7,918,992 B2 | 4/2011 | Bhan | |
| 7,922,894 B2 | 4/2011 | Plantenga et al. | |
| 7,927,480 B2 | 4/2011 | Podrebarac | |
| 7,931,739 B2 | 4/2011 | LaCour et al. | |
| 7,935,178 B2 | 5/2011 | Lechnick et al. | |
| 7,938,955 B2 | 5/2011 | Araki et al. | |
| 7,942,198 B2 | 5/2011 | Zirkle | |
| 7,947,168 B2 | 5/2011 | Machin et al. | |
| 7,955,401 B2 | 6/2011 | Ghonasgi et al. | |
| 7,959,797 B2 | 6/2011 | Wellington et al. | |
| 7,985,332 B2 | 7/2011 | Greaney et al. | |
| 7,988,767 B2 | 8/2011 | Graham et al. | |
| 8,002,967 B2 | 8/2011 | Hunter et al. | |
| 8,008,534 B2 | 8/2011 | Petri et al. | |
| 8,016,999 B2 | 9/2011 | Borgna et al. | |
| 8,025,791 B2 | 9/2011 | Wellington et al. | |

(56) References Cited

U.S. PATENT DOCUMENTS

| | | |
|---|---|---|
| 8,043,495 B2 | 10/2011 | Podrebarac |
| 8,070,936 B2 | 12/2011 | Wellington et al. |
| 8,075,762 B2 | 12/2011 | Greaney et al. |
| 8,083,813 B2 | 12/2011 | Nair et al. |
| 8,118,995 B2 | 2/2012 | King et al. |
| 8,123,932 B2 | 2/2012 | Montanari et al. |
| 8,128,805 B2 | 3/2012 | Vaarkamp |
| 8,128,811 B2 | 3/2012 | McCarthy et al. |
| 8,142,646 B2 | 3/2012 | Choi et al. |
| 8,152,994 B2 | 4/2012 | Subramanian et al. |
| 8,163,167 B2 | 4/2012 | Himelfarb |
| 8,163,179 B2 | 4/2012 | Nagamori et al. |
| 8,202,414 B2 | 6/2012 | Reesink |
| 8,216,520 B2 | 7/2012 | Choi et al. |
| 8,236,172 B2 | 8/2012 | Podrebarac et al. |
| 8,241,489 B2 | 8/2012 | Bhan et al. |
| 8,286,951 B2 | 10/2012 | Dart et al. |
| 8,288,303 B2 | 10/2012 | Higashi et al. |
| 8,303,804 B2 | 11/2012 | Helton et al. |
| 8,318,004 B2 | 11/2012 | Drnevich et al. |
| 8,318,644 B2 | 11/2012 | Kamimura et al. |
| 8,323,416 B2 | 12/2012 | Bradley et al. |
| 8,323,480 B2 | 12/2012 | Choi |
| 8,333,884 B2 | 12/2012 | Hunter et al. |
| 8,334,243 B2 | 12/2012 | Guevremont et al. |
| 8,366,913 B2 | 2/2013 | Choi et al. |
| 8,366,914 B2 | 2/2013 | Yang et al. |
| 8,371,741 B2 | 2/2013 | Hassan et al. |
| 8,394,254 B2 | 3/2013 | Wellington et al. |
| 8,394,261 B2 | 3/2013 | Litz et al. |
| 8,398,848 B2 | 3/2013 | McConnachie et al. |
| 8,403,043 B2 | 3/2013 | Khan et al. |
| 8,409,427 B2 | 4/2013 | Raybold et al. |
| 8,414,763 B2 | 4/2013 | da Silva Ferreira Alves et al. |
| 8,424,181 B2 | 4/2013 | Lewis et al. |
| 8,431,510 B2 | 4/2013 | Gabrielov et al. |
| 8,444,945 B2 | 5/2013 | Takatsu et al. |
| 8,445,418 B2 | 5/2013 | Yamada |
| 8,450,255 B2 | 5/2013 | Ikeda et al. |
| 8,455,407 B2 | 6/2013 | Schmidt-Amelunxen et al. |
| 8,476,210 B2 | 7/2013 | Short |
| 8,486,258 B2 | 7/2013 | Podrebarac et al. |
| 8,491,784 B2 | 7/2013 | Reynolds et al. |
| 8,506,794 B2 | 8/2013 | Bhan et al. |
| 8,518,244 B2 | 8/2013 | Schorfheide et al. |
| 8,563,486 B2 | 10/2013 | Tsujimoto et al. |
| 8,568,679 B2 | 10/2013 | Ripperger |
| 8,569,216 B2 | 10/2013 | Blain et al. |
| 8,591,726 B2 | 11/2013 | Umansky et al. |
| 8,603,953 B2 | 12/2013 | Aoki et al. |
| 8,608,938 B2 | 12/2013 | Wellington et al. |
| 8,608,942 B2 | 12/2013 | Subramanian et al. |
| 8,608,946 B2 | 12/2013 | Bhan et al. |
| 8,613,851 B2 | 12/2013 | Wellington et al. |
| 8,613,852 B2 | 12/2013 | Leta et al. |
| 8,617,383 B2 | 12/2013 | Prentice et al. |
| 8,642,517 B2 | 2/2014 | Matsui et al. |
| 8,642,521 B2 | 2/2014 | Ahlers et al. |
| 8,652,321 B2 | 2/2014 | Debuisschert et al. |
| 8,658,027 B2 | 2/2014 | Koseoglu et al. |
| 8,663,453 B2 | 3/2014 | Wellington et al. |
| 8,663,459 B2 | 3/2014 | Al-Shahrani et al. |
| 8,663,460 B2 | 3/2014 | Gallup |
| 8,673,133 B2 | 3/2014 | Yean et al. |
| 8,679,324 B2 | 3/2014 | Subramaniyam |
| 8,696,888 B2 | 4/2014 | Keusenkothen et al. |
| 8,702,975 B2 | 4/2014 | Gallup et al. |
| 8,703,663 B2 | 4/2014 | Tagawa |
| 8,709,989 B2 | 4/2014 | Yagishita |
| 8,715,489 B2 | 5/2014 | Martinie et al. |
| 8,721,871 B1 | 5/2014 | Dindi et al. |
| 8,728,177 B2 | 5/2014 | Jackam et al. |
| 8,728,304 B2 | 5/2014 | Gallup et al. |
| 8,734,637 B2 | 5/2014 | Taylor |
| 8,734,715 B2 | 5/2014 | Miller |
| 8,741,001 B1 | 6/2014 | Schuetzle et al. |
| 8,753,504 B2 | 6/2014 | Whyatt et al. |
| 8,754,016 B2 | 6/2014 | Tagawa et al. |
| 8,764,855 B2 | 7/2014 | Leonard et al. |
| 8,815,083 B2 | 8/2014 | Watson |
| 8,821,615 B2 | 9/2014 | Weiss et al. |
| 2002/0131927 A1 | 9/2002 | Anderson et al. |
| 2009/0173664 A1 | 7/2009 | Choi et al. |
| 2010/0243578 A1 | 9/2010 | Frost et al. |
| 2011/0024328 A1 | 2/2011 | Virdi et al. |
| 2011/0147266 A1 | 6/2011 | Choi |
| 2011/0272365 A1 | 11/2011 | DeFosse et al. |
| 2011/0315600 A1 | 12/2011 | Choi et al. |
| 2012/0024756 A1 | 2/2012 | Verma et al. |
| 2012/0085236 A1 | 4/2012 | McCorriston et al. |
| 2012/0085973 A1 | 4/2012 | Jungst et al. |
| 2012/0111769 A1 | 5/2012 | Hassan et al. |
| 2012/0118035 A1 | 5/2012 | Zhao et al. |
| 2012/0160502 A1 | 6/2012 | Pettigrew |
| 2012/0220500 A1 | 8/2012 | Matza et al. |
| 2012/0237430 A1 | 9/2012 | Anderson et al. |
| 2012/0273367 A1 | 11/2012 | Themy et al. |
| 2013/0056394 A1 | 3/2013 | Ancheyta Juarez et al. |
| 2013/0256191 A1 | 10/2013 | Zimmerman et al. |
| 2013/0256192 A1 | 10/2013 | Zimmerman et al. |
| 2013/0298601 A1 | 11/2013 | Prim et al. |
| 2013/0312974 A1 | 11/2013 | McClung, IV |
| 2013/0315794 A1 | 11/2013 | Schaffer et al. |
| 2013/0320258 A1 | 12/2013 | Lehrer et al. |
| 2013/0324397 A1 | 12/2013 | Wilson et al. |
| 2014/0065057 A1 | 3/2014 | Metheral et al. |
| 2014/0091009 A1 | 4/2014 | Banerjee et al. |
| 2014/0091010 A1 | 4/2014 | Banerjee et al. |
| 2014/0275693 A1 | 9/2014 | Zink |
| 2014/0353112 A1 | 12/2014 | Hassan et al. |

FOREIGN PATENT DOCUMENTS

| | | |
|---|---|---|
| JP | 2008-055291 | 3/2008 |
| JP | 2008-307475 | 12/2008 |
| WO | WO 2005/066304 | 7/2005 |
| WO | WO 2005/066305 | 7/2005 |

OTHER PUBLICATIONS

Extended European Search Report for European Patent Application No. 14155871.8 dated May 6, 2014, 5 pages.

"ABB Analytical—pH/ORP Sour Water Strip Tower," ABB, 2010, 2 pages.

"Fundamentals of Sour Water Stripping," KPS Technology & Engineering, Presented at the Brimstone Sulfer Symposia, 2008, 41 pages.

"Hydrogen Sulfide & Sour Crude Oil: "Hazard to Life—A Potential Killer"," Michigan Department of Licensing and Regulatory Affairs, 2004, 3 pages.

"Sour Water Stripper: Application Data Sheet ADS 2900-10/rev.C," Rosemount Analytical Inc, 2008, 2 pages.

Armstrong et al., "Sour Water Stripping," Today's Refinery, Jun. 1996, 5 pages.

Chastain, Jr., "Hydrogen Sulfide in Water Systems: What's that Smell?," Consultant's Update, Chastain-Skillman, Inc., 2008, 3 pages.

Skrtic, "Hydrogen Sulfide, Oil and Gas, and People's Health," submitted for fulfillment of Masters Degree, University of California, Berkeley, May 2006, 79 pages.

\* cited by examiner

METHOD AND SYSTEM FOR REMOVING HYDROGEN SULFIDE FROM SOUR OIL AND SOUR WATER

CROSS-REFERENCE TO RELATED APPLICATIONS

This application claims the benefit of U.S. Provisional Patent Application 61/768,029, entitled "METHOD AND SYSTEM FOR REMOVING HYDROGEN SULFIDE FROM SOUR OIL AND SOUR WATER" filed on Feb. 22, 2013, the entire contents of which are incorporated herein by reference in its entirety for all purposes.

FIELD OF THE INVENTION

Embodiments of the present invention are generally related to a system and method to remove hydrogen sulfide from sour water and sour oil. In particular, hydrogen sulfide is removed from sour water and sour oil without the need for special chemicals, such as catalyst chemicals, scavenger chemicals, hydrocarbon sources, or a large scale facility. The system and method in the present invention is particularly useful in exploratory oil and gas fields, where large facilities to remove hydrogen sulfide may be inaccessible. The present invention addresses the need for safe and cost effective transport of the deadly neurotoxin. Particular embodiments involve a system and method that can be executed both on a small and large scale to sweeten sour water and sour oil.

BACKGROUND OF THE INVENTION

Exploration of gas fields can involve discovery of wells that contain significant quantities of hydrogen sulfide and other organic and inorganic sulfur compounds. Oil, natural gas, and water with a high concentration of sulfur compounds such as hydrogen sulfide and sulfur dioxide are referred to as "sour." Hydrogen sulfide is a colorless, toxic, flammable gas that is responsible for the foul odor of rotten eggs. It often results when bacteria break down organic matter in the absence of oxygen, such as in swamps, and sewers alongside the process of anaerobic digestion. It also occurs in volcanic gases, natural gas and some well waters. Sour oil and sour water are not only undesirable as sour products are economically useful, they can be extremely toxic and deadly because high levels of sulfur and sulfur byproducts. For example, hydrogen sulfide is a highly toxic and extremely deadly gas. The industry considers oil or water containing 100 parts per million ("ppm") (0.01%) sulfur sour oil and sour water. Although this is the minimum level, oil wells and water can contain higher amounts. Oil and water can contain hydrogen sulfide up to 300,000 ppm (30%) at the immediate gas/liquid interphase, the vapor space in a tank or container, and the atmosphere surrounding a spill. At higher concentrations, hydrogen sulfide is toxic and deadly.

As used herein, the term "sour oil" refers to oil containing levels of hydrogen sulfide in an amount greater than 100 ppm (0.01%). Sour oil can also mean oil containing 0.5% or more sulfur by weight. The term "sour water" refers to water containing hydrogen sulfide in an amount greater than 100 ppm (0.01%). The terms "sweet," "sweetened," and/or "sweetening" mean a product that has low levels of hydrogen sulfide, has had hydrogen sulfide removed, or the process of removing hydrogen sulfide. The term "stripping" means removing hydrogen sulfide from water and/or oil. The terms "acceptable limits" or "acceptable amounts" or "acceptable levels" refer to the maximum amount of hydrogen sulfide allowed according to any of the pertinent regulations. For example, the Environmental Protection Agency ("EPA") has certain regulations regarding the concentration of hydrogen sulfide that may be released into the environment. Furthermore, the Occupational Safety and Health Administration ("OSHA") provides certain regulations on the amount of hydrogen sulfide one may be exposed to without being considered a health hazard. There may be other regulations that apply, such as state regulations. The terms "acceptable limits" or "acceptable amounts" or "acceptable levels" can also refer to the maximum amount of hydrogen sulfide allowed in oil and/or water in order for a facility to accept the materials.

Exploratory and developmental wells with high concentrations of hydrogen sulfide, far away from hydrogen sulfide removal facilities present a problem of transporting the sour water and sour oil. Both liquids must be transported by truck, sometimes long distances over public and private roads. In most cases, sour water, which is dangerous to transport, will also not be accepted by most re-injection facilities if it contains more than a trace amount of hydrogen sulfide.

Similarly, sour oil, which is also dangerous to transport, will not be accepted by most refineries or pipeline hubs, if it contains more than a trace of hydrogen sulfide. If one finds a facility willing to accept liquids with a high concentration of hydrogen sulfide, odds are they are hundreds of miles away from the exploratory well. A truck accident or a simple leak could endanger the transportation crew, as well as the public.

There are other problems downstream in the transportation of sour oil as well. For example, transport from the exploratory well to a treatment site is usually only the first step in the process. The oil typically has an end destination, whether it is another refinery, a distributor, or a consumer. Any contamination by hydrogen sulfide along the way would create a safety and environmental hazard. One example can be seen in transportation of oil that is obtained through a fracturing or "fracking" process. Oil extracted through the fracking process typically is sweet and contains little hydrogen sulfide. This oil has to be transported from the site to its end destination. The transportation can be hindered, however, if there is an upstream contamination of hydrogen sulfide of the shipping vessels or oils with different grades are mixed for shipping.

Rail shipment of crude oil has become an option for moving oil out of high production areas with little pipeline access. The shipping industry is adversely affected by having to address the shipping of hydrogen sulfide. The solution to rail safety issues are typically unanticipated costs, including rail car investments or new safety protocols to address the shipping of sour oil.

For example, an oil-loading rail terminal in North Dakota may be forced to shut down its facility unless the amount of hydrogen sulfide in crude oil delivered to the facility can be reduced. The oil-loading rail terminal requested the Federal Energy and Regulatory Commission (FERC) to restrict the amount of hydrogen sulfide in crude deliveries, after a large concentration of hydrogen sulfide was discovered a tank at an upstream facility. The terminal requested a limit of 5 ppm hydrogen sulfide. Another company objected to the request, as it ships crude oil to the terminal. In response, the terminal asserted that without the new limits to hydrogen sulfide coming to its facility, its employees who stand on top of rail tankers to pump crude could be exposed to harmful vapors. The terminal further argued that if higher levels were allowed to be delivered to its terminal, other terminals downstream would have to shut down its rail facility.

Even if the sour water and sour oil is treated to remove hydrogen sulfide content through conventional methods of using scavengers or other treating chemicals, facilities will not accept the treated water or oil if it contains too much of the treatment chemicals. This is especially problematic with wells containing high levels of hydrogen sulfide that require more of the treatment chemicals to remove the hydrogen sulfide concentrations.

Moreover, many regulations are in place regarding the treatment and disposal of sour oil and sour water. For example, in order to vent undesirable sour water, there has to be less than 10 ppm (0.001%) of hydrogen sulfide vented into the open air according to OSHA regulations. Burning sour oil quickly reaches the emission limits per site. For example, common limits for sulfur emissions are between 100 tons and 250 tons of sulfur. In order to achieve these lower concentrations, the industry has typically used methods involving the use of reducing sulfur content using chemical catalysts that remove sulfur. These are typically liquid hydrogen sulfide scavengers added to the water or oil to absorb the hydrogen sulfide and prevent it from becoming vapor. This solution is feasible and affordable where there is a low concentration of hydrogen sulfide in the water or oil. Once the gas product of the well gets much over 5000 ppm (0.05%), the oil and water will contain amounts of hydrogen sulfide such that liquid scavengers become very expensive. With wells approaching or exceeding 10,000 ppm (1%) hydrogen sulfide, the cost of using liquid scavenger on the oil and water products exceeds the value of the oil itself after transportation costs.

For example, a well with an average of 30,000 ppm (3%) hydrogen sulfide in its gas product, 40,000 ppm (4%) in the vapor space of its water tanks and 60,000 ppm (6%) in the vapor space of its oil tanks might easily cost $20 per barrel of water and $40 per barrel of oil to use hydrogen sulfide scavengers to treat those liquids so that they are safe for transportation. Even then, it takes a special refinery to be able to accept oil such high concentrations of the scavenger materials.

Furthermore, the liquid scavengers appropriate for water and oil are themselves very noxious chemicals. Workers dealing with these chemicals must wear full HAZMAT suits. And, if there is a spill of the scavenger chemicals at any point during transportation, it again poses a threat to the safety of the public and the transport personnel.

Sour oil and sour water high in hydrogen sulfide is extremely toxic and rapidly deadly. Hydrogen sulfide is lethal if inhaled in concentrations down to 1000 ppm (0.1%) in air or water or oil vapor. At low concentrations, hydrogen sulfide has a characteristic odor similar to the smell of rotten eggs. At higher concentrations, the typical rotten egg odor is lost, as hydrogen sulfide can fatigue the sense of smell.

Hydrogen sulfide is a very toxic gas at normal temperatures. It poses a very serious inhalation hazard. There is a large amount of information on human exposures. However, in most cases, the exposure levels and exposure durations are unknown or crudely estimated. Effects at various exposure levels are believed to be as follows: 0.001-0.13 ppm—odor threshold (highly variable); 1-5 ppm—moderately offensive odor, possibly with nausea, or headaches with prolonged exposure; 20-50 ppm—nose, throat and lung irritation, digestive upset and loss of appetite, sense of smell starts to become "fatigued", odor cannot be relied upon as a warning of exposure; 100-200 ppm—severe nose, throat and lung irritation, ability to smell odor completely disappears; 250-500 ppm—potentially fatal build-up of fluid in the lungs (pulmonary edema) in the absence of central nervous system effects (headache, nausea, dizziness), especially if exposure is prolonged; 500 ppm—severe lung irritation, excitement, headache, dizziness, staggering, sudden collapse ("knockdown"), unconsciousness and death within 4-8 hours, loss of memory for period of exposure; 500-1000 ppm—respiratory paralysis, irregular heartbeat, collapse, and death. It is important to note that the symptoms of pulmonary edema, such as chest pain and shortness of breath, can be delayed for up to 48 hours after exposure.

Prolonged exposure (for several hours or days) to concentrations as low as 50-100 ppm can cause a runny nose, cough, hoarseness, and shortness of breath. Prolonged exposure to higher concentrations can produce bronchitis, pneumonia and a potentially fatal build-up of fluid in the lungs (pulmonary edema). There are numerous case reports of deaths, especially among workers in the petroleum, sewage treatment, and agricultural industries. Most fatalities have occurred in relatively confined spaces (e.g. sewers, sludge tanks, cesspools, or hydrogen sulfide collecting in pits or dips on open land or in buildings). In many cases, multiple deaths have occurred at a single site. Rescuers, attempting to save an unconscious co-worker, have entered a hazardous and/or confined area without respiratory protection or safety lines. They, in turn, have been overcome by hydrogen sulfide.

Workers who survive a serious short-term hydrogen sulfide exposure may recover completely or may experience long-term effects. Nervous system and respiratory effects have been described in small human population studies or case reports. Permanent or persistent nervous system effects have included fatigue, anxiety, irritability, intellectual decline, reduced attention span, impaired learning and memory, altered sense of smell, and motor deficits. Some of the nervous system effects may be due to a lack of oxygen reaching the brain cells during a severe hydrogen sulfide exposure. Respiratory effects have included symptoms (shortness of breath upon exertion, chest tightness or wheezing) consistent with hypersensitivity of the airways (Reactive Airways Dysfunction); permanent lung damage (pulmonary fibrosis) and significant reductions in residual volume (one measure of lung function).

Although cyanides are better known to the general public to invoke thoughts of deadly poisons and toxicity, hydrogen sulfide are just as deadly. For example, incidents involving the deadly nature of hydrogen sulfide are well documented. One example involved the death of nine people in Texas who were killed by gases leaking from an unattended carbon dioxide injection system designed to extract oil from a well in Texas. Eight of the victims were in a house 100 yards from the well.

In another example involving transportation of hydrogen sulfide, two Michigan employees drove a tank truck to a sour oil well tank farm to obtain waste brine. When they failed to get a flow of brine from a ground level connection just outside the tank farm dike, they proceeded to the brine tank. One employee went to the top of the tank, which was 13 feet above the ground. He yelled a warning, but was instantaneously overcome by escaping hydrogen sulfide-rich gas. He was later found dead on the platform beside the top of the tank. The other worker waiting near the top of the stairs was overcome and collapsed before he could retreat. Fortunately, he fell down the stairway out of the area of contamination and regained consciousness. The hatch that had been opened was upwind of the access platform and about two feet above it. Clearly, it is beneficial to have a simple, economic, and effective way to reduce the level of hydrogen sulfide from materials in order to improve safety at exploratory sites and safety in the transportation of materials.

In addition to the health hazards due to exposure to hydrogen sulfide, hydrogen sulfide is a flammable gas that creates additional transportation hazards. Recently, 47 people died when a freight train transporting crude oil caught on fire when it wrecked. The composition is under investigation, as crude oil typically does not explode. Contamination of the shipment with hydrogen sulfide from an upstream source is being considered a culprit to why the freight train exploded unexpectedly. Certain embodiments of the present invention address the safety concerns with shipping oil containing hydrogen sulfide and can prevent contamination of otherwise less hazardous oil.

Other current methods to remove hydrogen sulfide involve the use of use natural gas to remove sulfur, or use specialized apparatus that use amine to remove sulfur. The majority of processes to sweeten oil involve absorption of hydrogen sulfide in an amine solution, use of a carbonate process, use of solid bed absorbents and physical absorption. For example, U.S. Patent Publication No. 2012/0111769 to Hassan et al. ("Hassan"), incorporated in its entirety by reference, describes a method where the sour oil is subjected to a high shear and at least one desulfurizing agent wherein the desulfurizing agent is selected from a group consisting of bases and inorganic salts to produce a high shear stream and separating the sulfur rich product and sweetened oil product from the high shear-treated stream. Hassan further describes a system and a method that use a shearing mechanism in combination with chemicals or other gases to remove sulfur. According to the Hassan system and method, one needs high shear and at least one chemical desulfurizing agent.

U.S. Pat. No. 8,216,520 issued to Choi et al. and Patent Publications Nos. 2011/0147266, 2009/0173664 and 2011/0315600 also by Choi et al. (collectively "Choi"), all incorporated by reference in their entirety, involves a system, method, and apparatus for upgrading heavy oil. Choi describes a system and method that involves combining heavy oil with a water feed in a mixing zone to form a heavy oil/water mixture, wherein the mixture does not exceed 150 degrees Celsius; subjecting the oil water mixture to ultrasonic waves to create a submicromulsion; pumping the submicromulsion using a high pressure pump to increase the pressure to or above the critical pressure of water; and heating the submicromulsion between 150 degrees C. and 350 degrees Celsius. Choi further describes adding a heated oxidant stream to the heavy oil/water mixture wherein the heated oxidant stream is at a temperature and pressure that exceeds the critical temperature and pressure of water; introducing the mixture into a zone essentially free of an externally-provided catalyst wherein the reaction is subjected to conditions that exceed the supercritical conditions of water such that a portion of hydrocarbons in the reaction mixture undergoing cracking to form an upgraded mixture. Furthermore, the Choi process requires subjecting the mixture to ultrasonic waves.

The Choi process requires a special apparatus that has a mixing zone to combine heavy oil with a water feed at a slightly elevated temperature to create a heavy oil/water mixture, where the mixing zone is an ultra-sonic wave generator; a pre-heating zone that is fluidly connected with the mixing zone, operable to heat the heavy oil/water mixture to a temperature up to about 350 degrees Celsius; a high pressure pumping means, operable to increase pressure of the heavy/oil water mixture to at least the critical pressure of water; and a reaction zone that is essentially free of an externally provided catalyst and an externally-provided hydrogen source fluidly connected with the pre-heating zone and able to withstand the temperature of the critical temperature of water and being able to withstand the pressure in excess of the critical pressure of water. The result is an upgraded oil with reduced amounts of substances such as sulfur.

The Choi process, although describing a system and method essentially free of external catalysts or external hydrogen to remove compounds including sulfur compounds, requires heating oil and water, mixing the water with an ultrasonic component, a high pressure system to bring the mixture to the critical pressure of water. Choi teaches away from a system and method that can remove sulfur byproducts, such as hydrogen sulfide, from sour oil without complex equipment and a highly controlled environment.

U.S. Pat. No. 4,253,298, issued to Blytas et al. ("Blytas") describes a method of sour water treatment in which sour water components are removed from a sour water stream in an electrodialysis step in which the sour water stream becomes the dilute stream. The Blytas process subjects a sour water stream to an electrodialysis step in which the acidic component and the basic component of the stream migrate from the stream through a fixed anion and cation exchange membrane to one or more concentrate streams, and steam strip the concentrate streams in order to remove the volatile acidic component and the volatile basic component. Blytas is incorporated by reference in its entirety. This method is geared toward a pre-process, upstream of an unspecified steam-stripping process. It uses electrodialysis which requires complex mechanical and process parameters not suitable for field use due to cost and portability. For example, Blytas uses a membrane to remove sour components from water. This is a pre-process treatment and does not address hydrogen sulfide vented in the steam process with regard to safely breathable concentrations. The present invention is devoid of the use of a membrane to remove hydrogen sulfide from sour water. Furthermore, the present invention does not require a steam-stripping process.

Other methods of removing hydrogen sulfide from water involve using a high voltage electrooxidation. U.S. Patent Publication No. 2012/0273367, by Themy et al. ("Themy") removes hydrogen sulfide through the use of electrooxidation. Themy is incorporated by reference in its entirety. Hydrogen sulfide is present as the part of hydrocarbon streams typical of petroleum recovery sources. Accordingly, hydrogen sulfide can contaminate various water sources and wastewater streams, including those from hydraulic fracturing operations. Hydrogen sulfide is corrosive and renders some steels brittle, leading to sulfide stress cracking, which is a concern in many applications, particularly when handling acid gas and sour crude oil in the oil industry. Thus, removal of hydrogen sulfide is desirable in the art. The primary method used in the art of removing hydrogen sulfide is the Claus process, which proceeds according to Formula $2H_2S+ O_2 \rightarrow 2S+2H_2O$. Other current technology available to remove hydrogen sulfide includes high pressure oxygenation of hydrogen sulfide solutions and oxidations with ozone and hydrogen peroxide. Therefore, the water purification systems and methods may also be useful for removing hydrogen sulfide from a water source. According to Themy, the electrooxidation cocktail removes hydrogen sulfide not only by oxidizing hydrogen sulfide to elemental sulfur or sulfur-containing anions (e.g., $SO_3^-$, $SO_4^{2-}$), but it also destroys sulfide reducing bacteria (SRB), which may be responsible for production of the hydrogen sulfide in some wastewater sources in the first place. Furthermore, some sulfur-containing organic compounds may be oxidized by the electrooxidation cocktail to reduce their odor (e.g., thioethers oxidized to sulfoxides or sulfones), and further oxidation of the hydrocarbon portion of these molecules may take place as set forth Themy to remove them from the purified wastewater.

U.S. Patent Publication No. 2013/0312974, by McClung IV et al. ("McClung") describes treating a well with a material to inhibit hydrogen sulfide producing bacteria. McClung describes adding an inhibitor to a treatment fluid. The treatment fluid is added to a source containing bacteria that produces hydrogen sulfide to inhibit the growth of the bacteria. McClung is incorporated by reference in its entirety.

By way of providing additional background, context, and to further satisfy the written description requirements of 35 U.S.C. §112, the following references are incorporated by reference in their entireties for the express purpose of explaining the nature of the oil and gas industry and methods to further describe the various systems, sub-systems, tools and components commonly associated therewith: U.S. Pat. No. 4,218,309, issued to Compton, U.S. Pat. Nos. 4,447,330 and 4,536,293 issued to Babineaux, III, Japanese Patent Publication No. 2008055291, invented by Mashahiko et al., Chinese Patent No. 101532380 issued to Zhengguo.

The process to remove the sulfur content from sour water also requires specialized equipment, as sour water has corrosive properties. Using air to remove hydrogen sulfide, or "aeration," as a unit operation depends on two basic principles: equilibrium conditions and mass transfer considerations. The water to be treated is in equilibrium chemically with its component species and physically in equilibrium with the atmosphere above the water surface. These equilibrium conditions define the limits of the gas transfer process. Aeration is an effective removal mechanism because hydrogen sulfide exists as a dissolved gas in some water. Incidentally, the function of aeration is not specifically to oxygenate the water; rather it is to strip the dissolved gas (hydrogen sulfide) out of the water by changing the equilibrium conditions of the water and thus drive the dissolved gas out.

The removal of hydrogen sulfide by air stripping is defined by application of Henry's Law. Henry's Law, however, is generally associated with dilute solutions. Henry's Law relates the concentration of a gas in the water to the partial pressure of the gas above the liquid. It is recalled that partial pressure is pressure that a particular gas exerts as it moves toward equilibrium. Equilibrium occurs as gasses flow from regions of higher partial pressure to regions of lower pressure. The larger this difference, the faster the flow. Hydrogen sulfide exists in equilibrium in three different forms as shown in the reactions below with their respective pK (disassociation) values.

$$H_2S \rightleftharpoons HS^- + H^+ \quad pKa = 7.1$$

$$HS^- \rightleftharpoons S_2^- + H^+ \quad pKa = 14$$

Certain facilities prohibit air stripping because of the potential combustible off gases and the costly residual air incineration, where the current processes in use teach away from using air to strip sour water. Importantly, traditional processes of using air to strip sour water are used primarily on sour water with very low contaminant concentrations.

While it is known that air can potentially be used to strip water, the majority of current processes use specialized equipment, complicated processes, or use natural gas or other materials to remove high levels of hydrogen sulfide. For example, Japanese Patent No. 2008307475A, issued to Kyoji et al. ("Kyoji"), describes an apparatus and method to remove hydrogen sulfide from groundwater. Kyoji is incorporated by reference in its entirety. According to Kyoji, the preferred embodiment of the apparatus uses a pump to pump ground water into a storage tank. A pipe applies air to the water in the storage tank, releasing hydrogen sulfide in a gas phase. The gas phase is then sent to a separate desulfurizing compartment that contains a desulfurizing agent such as iron oxide or activated carbon. Air is then vented from the desulfurizing compartment. The water is then sent to a separate tank where the water is processed to remove any suspended matter or precipitate in the remaining water. The water is then discharged after treatment in the separate water treatment tank. Kyoji requires a separate compartment from which air is vented to contain a desulfurizing agent, such as a chemical catalyst. Although Kyoji mentions that certain embodiments of the apparatus do not contain a separate desulfurizing compartment, it is unclear if Kyoji's alternate embodiment would vent air directly from the compartment containing the sour water. Such alternate embodiment does not account for human safety or environmental safety. Thus, Kyoji does not disclose a separate compartment, devoid of any catalysts or additional desulfurizing agents, where the concentration of hydrogen sulfide is measured before it is vented to ensure the concentration of hydrogen sulfide is within the acceptable limits.

European Patent Application Publication No. 2495219 ("EP '219") describes a method for removing contaminants from feedwater. EP '219 is incorporated by reference in its entirety. EP '219 describes a method that includes forming a dispersion of bubbles of a treatment gas in a continuous phase comprising feedwater, wherein the bubbles have a mean diameter of less than about 5 micrometers, and the gas is selected from air, oxygen, and chlorine. The gas bubbles have a mean diameter of less than 1 micrometer, or no more than 400 nanometers ("nm"). In the method described in EP '219, the feedwater and treatment gas mixture and the continuous phase is subjected to a shear rate of greater than about 20,000 s-1. The treatment gas and the continuous phase are contacted in a high shear device, wherein the high shear devices comprises at least one rotor, and wherein the at least one rotor is rotated at a tip speed of at least 22.9 meters/second (4,500 feet/minute) during formation of the dispersion. The high shear device produces a local pressure of at least about 1034.2 MPa (150,000 pounds per square inch, "psi") at the tip of one rotor during the formation of the dispersion. The energy expenditure of the high shear devices during the formation of the dispersion may be greater than 1000 W/m3. The dispersion is introduced into a vessel and particle containing water is extracted from the vessel. The particle containing water is then introduced into a separator. This method uses a specific mechanical device with very specific mechanical and process parameters to remove hydrogen sulfide and other contaminants from water. While its advantages (may be contained in a small footprint, may result in water suitable for direct disposal into surface lakes, streams or municipal water facilities, seems a fast process) appear useful in other work environments, they are not needed for produced water transportation or disposal in remote or field oil and gas production scenarios. Also, the advantages come at a greater cost not suitable for field use because the method uses a specific mechanical device with very specific mechanical, power use and process parameters and it vents hydrogen sulfide and where chlorine gas is used a further possibly toxic, non-breathable mixture without regard to safely breathable concentrations.

Other known aeration processes to remove hydrogen sulfide from water are unsuited for removing high levels of hydrogen sulfide as those encountered at exploratory sites. For example, certain processes have materials containing hydrogen sulfide exposed to the open environment. This is problematic when materials have high levels of hydrogen sulfide, as the hydrogen sulfide escaping into the open environment is toxic and hazardous. Certain embodiments of the present invention comprise an enclosed environment for the materials containing hydrogen sulfide to prevent high concentrations of hydrogen sulfide to be released into the open environment.

Other processes use catalysts to strip sour water. U.S. Pat. No. 4,784,775 issued to Hardison ("Hardison") discusses a system to remove hydrogen sulfide from sour water using an aqueous chelated polyvalent metal solution as a catalyst. The present invention removes hydrogen sulfide from sour water without the need of a chemical catalyst.

Known sour water treatment processes are complex and have other disadvantages, such as requiring meticulous process parameters. The present invention is novel and improves on the prior art because the only parameter that must be closely monitored is the concentrations of hydrogen sulfide in the air space that is eventually vented into open air. The present invention can be implemented with very minimal parameters. Deviations in the described process may affect the overall time of the process or efficiency. However, as those skilled in the art can recognize, deviations have little impact on the efficacy of the invention. For example, in certain embodiments, perforations in the diffusion bar located in a tank containing sour water can be 0.25 inches in diameter. In other embodiments, the perforations can be as small as 0.05 inches in diameter. In yet other embodiments, the perforations can be 1.00 inches in diameter. The present invention provides a simpler way to remove hydrogen sulfide such that no automation is required. Although no automation is required for the present invention, certain embodiments include automation. Any parameters described in certain embodiments are not intended to limit the scope of the invention in any way and are only provided as an example to illustrate the novelty and improvements of the present invention over the prior art.

Present methods of sweetening oil and stripping sour water is cost restrictive, and only becomes economical when performed in large scale. Building such facilities is impractical at exploratory sites. The present invention, can be performed at any scale, using no more than items and equipment that would already be at the exploratory site and other items readily obtained from a local hardware store such as Lowe's or Home Depot.

Treatment facilities can be inaccessible to those who are performing exploratory drilling. Furthermore, the equipment and materials required to perform traditional processes are not cost effective at exploratory sites. Those working at remote exploratory sites do not have access to the resources needed to sweeten sour oil or sour water. For example, many of the typical processes use sweet natural gas to sweeten oil or to sweeten water. Often, a source of sweet natural gas is not readily available, and it is not economical to sweeten sour natural gas in order to use to treat sour oil or sour water.

Due to the remote nature of exploratory facilities, the toxic and deadly materials must be transported significant distances to a treatment facility. Anyone involved in the transportation is subject to the potential hazards of hydrogen sulfide, as well as the potential environmental disaster that could occur if something happens along the way from the remote well site to the treatment facility.

Certain embodiments of the invention provide a system and method to sweeten sour oil and water without a need to use hydrocarbons or other catalysts. This is especially useful in the exploratory gas industry when access to traditional methods used to sweeten oil and water are not readily available and could be many miles away. Certain embodiments include a system and a method that comprise collecting the sour oil in a container, maintaining the sour oil in an air-free environment, adding water, and agitating the mixture. Other embodiments of the present invention include using sour water to remove hydrogen sulfide from sour oil.

SUMMARY OF THE INVENTION

The present invention relates to a system and method of removing hydrogen sulfide from oil and water. The present invention also reduces the sulfur-by-weight content. Current ways to remove hydrogen sulfide from oil and water typically use specialized equipment and expensive chemicals. Hydrogen sulfide is a toxic chemical, and transportation of materials that contain high levels of hydrogen sulfide presents dangers to all those involved. This is especially problematic for exploratory wells, which are often located hundreds of miles away from the closest treatment facility. The present invention comprises treating oil or water to remove hydrogen sulfide. The present invention can be used with sour water and sour oil with high levels of hydrogen sulfide as well as lower levels. The hydrogen sulfide is removed without specialized equipment or expensive chemicals. The sweetened water or sweetened oil can be transported without placing those involved in handling and transportation at risk of potentially fatal mishaps and minimizes and environmental hazards.

In certain embodiments, the invention comprises an air source, a tank, a plurality of lines that distribute air from the air source to the tank and a vent stack, connections that distribute the air from the air source into the tank, a hydrogen sulfide monitor, and a vent stack connected to the water tank and air source. The air from the air source runs to a tank filled with sour water through an airflow line. The airflow line is connected to a pipe with at least one hole. The pipe is located in the water tank. A second line runs to the vent stack through a second airflow line. In certain embodiments, air flows to the vent stack at a rate of 120 standard cubic feet per minute ("scf/m"). The airflow is adjusted incrementally every hour for twelve hours. The air distribution ratio is adjusted hourly until the ratio of airflow to the water tank line increases to about 120 scf/m and the airflow to the vent stack decreases to about 20 scf/m. The amount of hydrogen sulfide is measured near the top of the vent stack. The air with the acceptable levels of hydrogen sulfide is then vented. The plurality of lines running from the air source are secured by typical ways known to those skilled in the art to connect air lines to air source. Embodiments of the present invention ensure that any materials containing hydrogen sulfide are enclosed within the invention and not exposed to the outside environment. As those skilled in the art will recognize, the air source can be any air source able to generate air, such as a compressor or a blower.

U.S. Pat. No. 3,547,190 issued to Wilkerson ("Wilkerson"), describes an apparatus and method for treating waste water associated with hydrocarbon production. Wilkerson is incorporated by reference in its entirety. According Wilkerson, waste water from a well is pumped under pressure to a plurality of spray nozzles which are disposed in such a manner as to spray the water into the atmosphere in a substantially vertical direction in open air. The sprayed water is thus aerated to remove the residual hydrogen sulfide therefrom and reduce its temperature. The water is then collected in a basin wherein any excess oil still associated with the water may be skimmed from the surface of the water. The method described in Wilkerson would lose efficiency as the temperature of the process water decreases from boiling point. In some specific field applications where water coming from the well itself is very hot, this method may be useful. For all other field applications, there are problems with its implementation. For example, it operates in a fairly narrow envelope of parameters, both mechanical and process. Nozzle-size and upstream pump pressures will be fairly critical. It may result in mist (as opposed to vapor) being blown onto adjoining property, legally a spill. Wilkerson requires hot water for efficiency and may not be suitable for cold-weather applications, regardless of the temperature of the initial process water.

Of note, Wilkerson vents hydrogen sulfide without regard to safely breathable concentrations. Any hydrogen sulfide not vented in the initial pass vents from an open body of water at a rate that is both difficult to measure and difficult to control. This particular method is very problematic in this regard, and as those skilled in the art can recognize, the present invention alleviates the safety hazards associated with releasing hydrogen sulfide into the environment. Although it is known in the art that exposing water or oil containing hydrogen sulfide to air will remove hydrogen sulfide, embodiments of the present invention allow the aeration to remove hydrogen sulfide in an enclosed environment to eliminate any safety risks and environmental hazards associated releasing hydrogen sulfide in an open environment.

In other embodiments, the present invention comprises a container filled with water, a separate container filled with oil, a means to distribute water from the container filled with water to the container filled with oil. The water can be sweet water or sour water. The water travels through the sour oil as it has a lower specific gravity. This travel through the oil creates an agitation, and the hydrogen sulfide is removed from the oil as the water passes through the oil. The agitation occurs at the oil/water interface. Oil will release hydrogen sulfide into the water wherever water containing a lower hydrogen sulfide concentration contacts oil containing a higher hydrogen sulfide concentration.

U.S. Pat. No. 3,977,972 issued to Bloch et al. ("Bloch") describes a system and a method to remove hydrogen sulfide from seal oil through bubbling a gas such as nitrogen. Bloch is incorporated by reference in its entirety. Bloch's preferred embodiment contains a compressor having a shaft which rotates in a pair of liquid-film seal cartridges which serve as seal retainer housings for the rotary shaft of the compressor. Each of the liquid-fill seal cartridges includes a pair of floating, non-rotation sleeve portions surrounding the shaft and interconnected by an intermediate space portion through which the shaft freely extends. Contaminated oil is then transferred to a cylindrical drum, where the diameter of the drum may be on the order of two feet while its height may be approximately twice the diameter. The lower interior portion of the drum is provided with a baffle in the form of a simple flat sheet of metal extending upwardly approximately 2 feet from the bottom of the drum to divide the lower interior portion of the drum into a pair of chambers which has a cross section of a semicircle. Contaminated seal oil flows into one of the chambers, where a sparger means bubbles up air or nitrogen through the oil. The oil flows to the second chamber, where a sparger means bubbles up air or nitrogen through the oil. Bloch, while possibly suitable for refined seal and lubrication oils that may become contaminated by higher sulfur fuels, is neither suitable nor safe to use with crude oils or any other oil that releases combustible case into the air. Although the use of pure nitrogen or another inert gas might address combustion problem, it is impractical and uneconomical to obtain a pure nitrogen source at exploratory sites, and would also create a low oxygen environment (breathable oxygen) in the area near the vent. Neither is it suitable for higher concentrations (above 10 ppm) of hydrogen sulfide due to its direct, un-diluted vent. As those skilled in the art can appreciate, the use of water to remove hydrogen sulfide content in oil reduces the risks associated with adding an outside air source to a combustible material such as oil.

In certain embodiments, nitrogen can be used to keep the oil-water interface fresh, where the water agitation sweetens the oil. Nitrogen is introduced into the bottom of the oil stripping tank periodically at a low volume, for example, at a rate of 10 standard cubic feet every 15 minutes as an additional safety measure to prevent flammable gas buildup.

In certain embodiments, the present invention comprises a tank with a mixture of oil and sour water, a separate tank with sour water, air distributors pumping air through the tank with sour water to remove hydrogen sulfide, pumping the sweetened water into the tank containing the oil and water mixture, and allowing the water from the oil and water tank to flow into the sour water tank through a gravity-feed. As those skilled in the art can appreciate, the present invention is an improvement to the prior art that requires the use of catalysts, scavengers or other expensive and specialized equipment.

Certain embodiments of the present invention can be implemented using containers typically used in the oilfield, such as commonly used 500 barrel "frac" tanks and 400 barrel cylindrical upright tanks. In one embodiment, a 185 scf/m air compressor derated for 5000 feet elevation to 140 scf/m can be used as the air source. A disperser bar with at least one hole is placed in the water tank. The disperser bar can be 1" or 1.5" pipe. The vent line from the water tank to the vent stack is 3" in diameter.

The equipment described herein is provided as an example only and should not be construed to limit the present invention, as the present invention can be used in almost any scale, For example, the present invention can be used with samples smaller than 500 ml oil or water as well as tanks having a volume in excess of 1000 barrels.

For example, certain embodiments comprise equipment that can be placed in mobile transportation, such as a trailer or the back of a pickup truck. Certain tanks, which are commercially available, are designed to fit in the back of a pickup truck. This embodiment allows easy transport and allows sour oil and sour water located in remote locations where larger equipment is unusable, impractical, or impossible because of the remote area.

In certain embodiments, the equipment can be placed in a tow trailer, where the invention comprises a configuration comprising an automation cabinet, an air source, a power source, such as a generator, a water pump, and hose or piping connectors. As those skilled in the art can appreciate, variations of this embodiment can also be practiced with other types of tanks that are mobile and can be transported from site to site, and are within the spirit of the invention. The descriptions herein are not intended to limit the present invention.

In certain embodiments, the invention comprises an air source, a plurality of storage devices, connections that distribute the air from the air source into a storage device comprising water, and a vent stack connected to the storage device comprising water and air source. The air from the air source runs to the storage device comprising sour water through an airflow line. The airflow line is connected to a pipe with at least one hole. The pipe is located in the storage device comprising sour water. A second line runs to the vent stack through a second airflow line. In certain embodiments, air flows to the vent stack at a rate of around 120 scf/m. The airflow is adjusted incrementally every hour for twelve hours. The air distribution ratio is adjusted hourly until the ratio of airflow to the water tank line increases to around 120 scf/m and the airflow to the vent stack is decreased to around 20 scf/m. The amount of hydrogen sulfide is measured near the top of the vent stack. The air with the acceptable concentrations of hydrogen sulfide is then vented. The sweetened water is then pumped from the water tank to a second storage device comprising a mixture of sour oil and water through an attachment attaching the water tank to the top of the second storage device comprising sour oil and water. The storage device comprising a mixture of sour oil and sour water is equalized.

Water is pumped from the storage device comprising sour water into the storage device comprising the mixture of sour oil and water. For example, in embodiments comprising 400 or 500 barrel tanks, a suitable rate would be pumping water from the storage device comprising water into the storage device comprising the mixture of sour oil and water at a rate of 3 barrels per minute. Other rates are also possible, such as a rate of 20 to 50 gallons per minute. As the water passes through the oil due to its higher specific gravity, hydrogen sulfide is removed from the oil. The water that is now at the bottom of the storage device comprising oil and water has higher concentrations of hydrogen sulfide. The water from the bottom of the storage device comprising oil and water flows back to the storage device comprising water due to hydrostatic pressure, i.e., a "gravity feed," through an attachment between the bottom of the storage device comprising oil and water tank and storage device comprising water. The water is then stripped to remove hydrogen sulfide so that the concentrations of hydrogen sulfide reach a level that is acceptable to vent. Embodiments of the present invention ensure that any materials containing hydrogen sulfide are enclosed within the invention and not exposed to the outside environment.

Certain embodiments of the invention include a cavitation vent to keep air out of the oil stripping tank.

In certain embodiments of the invention, the water used in the stripping process comprises a pH of approximately 7.2 or below. In certain embodiments, the removal of all hydrogen sulfide may be desired. In embodiments where all hydrogen sulfide is desired to be removed, the hydrogen sulfide could be completely removed once environmental temperatures are above 45 degrees Fahrenheit.

Another embodiment of the invention includes a way to automate regulation of air distribution. In certain embodiments, a loop controller is attached to a hydrogen sulfide sensor monitoring the concentration of hydrogen sulfide from the vent stack. In this embodiment, the loop controller is attached to the vent stack, the air line to the water stripping tank, and the air line to the vent stack. The loop controller is used to keep the air vented below 10 ppm. The loop controller is connected to a current to pressure converter ("I to P converter"). In certain embodiments, the I to P converter converts the controller 4 to 20 ma output to 0 to 15 psi pneumatic. As those skilled in the art can appreciate, different types of I to P converters may be used with the present invention, and the I to P converter described herein is not intended to limit the present invention.

Certain embodiments include at least one I to P converter. A specific air line could be regulated by a dedicated I to P converter. In other embodiments, the I to P converter could regulate a plurality of air lines. In preferred embodiments, the use of one I to P converter may be advantageous because it assures a "safe state" upon loss of control signal (either electric or pneumatic) where all the air would divert into the vent stack, and the valves would return to their default position.

Based on the information received from the loop controller, the I to P converter or converters will send more air to the air line connected to the vent stack and less air to the air line connected to the tank comprising water, i.e., the water stripping tank, as the hydrogen sulfide stream exceeds 10 ppm when the hydrogen sulfide monitor reads a concentration exceeding 10 ppm. If a concentration detected by the hydrogen sulfide sensor falls below 10 ppm, the loop controller sends more air to the air line connected to the water stripping tank. In certain embodiments, the loop controller could be calibrated where it would reset at a one minute interval, and also calibrated so that there is a variance range of 2 to 3 ppm where no change in control to the air lines would be transmitted.

In certain embodiments, the automation can be controlled with an automation control. The automation control allows for measurement of the number of barrels of oil sweetened by the present invention.

In certain embodiments, the automation control comprises a programmable logic controller ("PLC"), a plurality of compartments, an air source, connections that distribute the air from the air source to the desired compartments, a pumping means, sensors, sensor cables, and a vent stack connected to a compartment comprising water. A first compartment is filled with water which can comprise hydrogen sulfide. A second compartment is filled with a mixture comprising sour oil and sour water in an equalized amount. The sensors are attached by sensor cables to the compartments comprising water, sour oil and sour water, and a vent stack. Water from the first compartment is distributed to the second compartment through a connection located at the top of the second compartment. As the water passes through the oil due to its higher specific gravity, hydrogen sulfide is removed from the oil. The sensor in the second compartment detects the amount of hydrogen sulfide in the second compartment. The water that is now at the bottom of the second compartment has higher concentrations of hydrogen sulfide. The water from the bottom of the second compartment flows back to the first compartment comprising water due to hydrostatic pressure through an attachment between the bottom of the second compartment and the first compartment. The sensor in the first compartment measures the amount of hydrogen sulfide in the first compartment. The sensor in the vent stack also measures the amount of hydrogen sulfide in the vent stack. Air is distributed to the first compartment from the air source through an airflow line. The sensor in the first compartment measures the amount of hydrogen sulfide present in the first compartment. The sensor in the vent stack measures the amount of hydrogen sulfide present in the vent stack. Once the sensor detects the amount of hydrogen sulfide is within the desired limit programmed into the PLC, air is automatically vented. Sweetened water is then pumped from the first compartment to the second compartment. As those skilled in the art can appreciate, the sensors monitor the amount of oil sweetened by the process.

In other embodiments, the data regarding the number of barrels of oil sweetened is transferred remotely to a database where the number of barrels of oil sweetened can be stored and analyzed. This data transfer can occur via wireless means including cellular internet protocol, Bluetooth, or other wireless data transfers.

Other embodiments use a high pressure, low volume water pump to circulate stripped water through a sample to remove hydrogen sulfide. These embodiments comprises an air compressor or air pump, a container used as a water stripping reservoir, a high pressure, low volume pump, a relief regulator, a container filled with an oil sample pressurized to the sampled psi, a container filled with a water sample, and a liquid pressure regulator. The air compressor or air pump pumps air into the reservoir containing water to be stripped. For example, a Coralife SL-381.3 scfm pump may be used. Air is then pumped into a water stripping reservoir. The water stripping reservoir is at atmospheric pressure. An example of the water stripping reservoir may comprise a plastic or metal material with a five to ten liter capacity. The water stripping reservoir is filled to ¾ or ⅝ of its volume capacity with distilled water. Water from the water stripping reservoir then travels to a high pressure low volume pump. The pump may comprise a pneumatic pump or an electric pump. For example, the pump may comprise a Texsteam 5000 series. A relief regulator is connected to the high pressure low volume pump, and vents as necessary. As an example, the relief regulator may be set at the sample container MAOP, such as 2000 psi. The water from the high pressure low volume pump then travels to a container with the oil sample. For example, certain embodiments may use a 1000 cubic centimeter ("cc") container, pressurized at 75 psi. The water passes through the oil sample container to a separate container, containing a water sample. In certain embodiments, the container for the water sample may comprise a 1000 cc container. The water then passes from the water container back to the water stripping reservoir. A liquid pressure regulator may be attached to the line traveling from the container with the water sample to the water stripping reservoir. The liquid pressure regulator may be set at the oil sample pressure, e.g. 75 psi.

In yet another embodiment, the present invention comprises a container filled with water, a separate container filled with oil, a distributing means that distributes water from the container filled with water to the container filled with oil.

In certain embodiments, the invention includes of filling a tank with sour water, aerating the sour water to strip the sour water, pumping the sweetened water into a separate tank comprising an equalized mixture of sour oil and sour water, removing hydrogen sulfide from the sour oil, pumping the resulting sour water into the tank filled with sour water.

In certain embodiments, the invention includes components that can be used in remote areas, such as exploratory wells. As those skilled in the art can recognize, the invention eliminates the need for expensive and specialized equipment that is currently used to remove hydrogen sulfide from sour water and sour gas. Furthermore, the invention can be used to strip sour water and treat sour oil containing hydrogen sulfide in any amount, even exceeding 300,000 up to saturation—an amount higher than equipment that taught in the prior art. For example, U.S. Pat. No. 5,286,389 issued to Hardison (the "Hardison '389 patent"), incorporated in its entirety by reference, describes a system and apparatus to strip hydrogen sulfide from water. The Hardison '389 patent method and apparatus specifically states the apparatus and method is particularly effective to treat sour water containing around 5 ppm to 500 ppm hydrogen sulfide. Thus, the Hardison '389 patent teaches away from using such prior art with water containing high levels of hydrogen sulfide. The levels of hydrogen sulfide do not influence the present invention, and the present invention can be used with materials containing very high levels of hydrogen sulfide.

U.S. Pat. No. 6,444,117, issued to Kahn et al. ("Kahn"), describes a process for desulfurizing sulfur-containing crude oil streams. Kahn is incorporated by reference in its entirety. Kahn requires heating the sulfur containing crude oil to an elevated temperature to at least 300 degrees Fahrenheit (149 degrees Celsius) to about 600 degrees F. (316 degrees C.) for an extended period of time, stirring and bubbling an inert gas, such as nitrogen into the crude oil, and adding a scavenger or catalyst into the crude oil stream to generate an exhaust gas such as hydrogen sulfide. Kahn requires a careful monitoring of and control liquid temperature to remain safe. Its maximum efficiency envelope immediately borders the flash-point of the oil sweetened (unsafe). These parameters must be monitored and controlled constantly and will vary widely with different types and grades of crude oil. Kahn acknowledges that additional steps may be required to reduce the amount of hydrogen sulfide generated by heating the crude to the levels described. Kahn vents both hydrogen sulfide and low-oxygen mixture without regard to safely breathable considerations. As those skilled in the art can appreciate, the present invention is a much simpler process that is much safer than what is known in the prior art.

United States Patent Application No. 2013/0324397, by Wilson et al. ("Wilson") describes using a carbon adsorbent for hydrogen sulfide removal. The hydrogen sulfide adsorbent is added to the material containing hydrogen sulfide. Wilson is incorporated by reference in its entirety.

The present invention involves a system and a method that removes hydrogen sulfide from water and oil in a very cost effective manner. Furthermore, certain embodiments allow the hydrogen sulfide to be removed on-site at remote locations, such as exploratory wells. Certain embodiments allow removal of hydrogen sulfide from water and oil, diluting the concentration to amounts that can be safely vented into the environment, in accordance with current environmental and safety regulations and without endangering anyone in the surrounding area, any animal in the surrounding area or the environment.

The present invention also reduces sulfur by weight. Typical worldwide definition for sour oil is generally about 0.5% sulfur by weight. The present invention can be used to sweeten oil such that the oil is lower than the 0.5% acceptable rate.

Other embodiments are directed to improving the price spread, which is the value of sweet oil versus sour oil, measured in dollars. The price spread can vary between $5 USD and $16 USD per barrel. It is difficult, and not usually feasible, to blend out high volumes of hydrogen sulfide in oil. It is not difficult, but may be costly, to blend out high sulfur weights. One would have to blend a prohibitive amount of 0% ppm hydrogen sulfide with 10,000 ppm oil in order for the resulting total volume to currently accepted limits of 0.5% or 5 ppm. By first treating oils as described herein, then blending oils in a 1:1 ratio or equal volumes of 0.1% sulfur by weight would result in a sweet-price oil. Blending is typically expensive, but by first treating oils as described herein, provides a low cost method of minimizing the post-process blending ratio, or eliminates the need to blend oils to increase the price spread.

Certain embodiments of the present invention include a plurality of tanks containing different levels of sour oil. The oil in one of the tanks can be treated to remove hydrogen sulfide and then blended with oil from another tank to improve the price spread.

Other embodiments comprise an additional chamber where the removal of hydrogen sulfide from the air can be further stripped thus increasing the rate of hydrogen sulfide removal before venting once the hydrogen sulfide levels are within the desired limits.

In yet another embodiment, the system and method comprise safe transport of sour water and sour oil from a remote area such as an exploratory well. High concentrations of hydrogen sulfide are extremely toxic and deadly. Transportation of such materials is extremely dangerous and puts everyone involved at risk, from the personnel handling the materials at the site, those involved in loading the transportation vehicle, the driver of the transportation vehicle, to the personnel at the treatment plant unloading the toxic materials. The danger of a deadly mishap increases as more people have to handle the toxic materials, and the greater the distance traveled further puts the handlers at risk. In certain embodiments, the present invention involves a system and method to neutralize the risk involved in transporting toxic materials, such as sour water and sour oil with high concentrations of hydrogen sulfide. As those skilled in the art can appreciate, the present invention renders the transport of materials high in hydrogen sulfide unnecessary, thus improving the safety to those involved in transporting the materials, and reducing liability that may result should an accident occur during transportation.

Use of the current invention at exploratory wells is especially beneficial. For example, when a crew is at an exploratory well, they test to see the quality of wells for hydrogen sulfide. At some wells, the levels are extremely high, and cause a danger to any person in the area. In order for samples to be provided for further analysis, the crew subjects themselves to the danger not only in the levels of hydrogen sulfide in the sour oil and sour water, but also dangers in transporting samples. In order to transport any of the sour oil or the sour water, a crew would have to wear full protective gear to load the truck tankers. Then the crew would have to travel over arduous roads with sour oil or sour water containing hydrogen sulfide in such high concentrations that it could cause sudden death. Any accident along the way would release such hazardous chemicals, and could kill the drivers, as well as due extensive harm to the environment. Even when the drivers reach the sample or treatment facility, the crews at those facilities are placed at risk. Any error in the process could prove fatal.

The present invention neutralizes this risk. In certain embodiments, there is no need for expensive chemicals, which themselves are hazardous, and the invention eliminates the need to haul a potentially deadly toxin or toxins long distances, whether hydrogen sulfide, chemical scavengers, chemical catalysts, or other chemicals. Other embodiments allow oil and water with high concentrations of hydrogen sulfide to be sweetened on site before loading the trucks to transport, transporting the sweetened water or oil, and unloading the sweetened water or oil at a facility that will run further analysis or even to sell the sweetened oil.

For example, in certain embodiments, sour oil or sour water would be detected at an exploratory site, far away from a facility that could treat the sour oil or sour water to remove levels of hydrogen sulfide. In this embodiment, the sour water and sour oil is treated in accordance with the present invention at the exploratory site for easy transportation. This includes aerating sour water contained in one tank, monitoring the amount of hydrogen sulfide concentration in the water tank, venting air from the vapor space of the water tank when the hydrogen sulfide is at acceptable levels, pumping the sweetened water from the water tank into a separate tank containing an equalized sour oil and water mixture, continuing to pump water into the tank containing the oil and water mixture until the amount of hydrogen sulfide in the oil is at acceptable levels, returning water from the tank containing oil and water to the water stripping tank, continuing to aerate the water until the levels of hydrogen sulfide are acceptable. Then, the oil is removed from the tank containing oil and water, loaded into another container for shipment, such as a tanker. The oil, having little to no hydrogen sulfide content is then transported from the exploratory site to a destination where the oil could be subjected to other tests, or even sold. The water could be re-used in the process, or could be transported from the exploratory site to a destination for further testing or disposal. As those skilled in the art can appreciate, the risks involved in transportation of materials containing hydrogen sulfide is reduced or eliminated, as the transported materials contain little or no hydrogen sulfide. In other embodiments, the invention addresses an unknown danger except for those involved regarding transportation of sour oil or sour water. In certain embodiments the transportation method comprises shipping oil or water via a common carriers or private carriers, including via FedEx or UPS. Since there is little to no hydrogen sulfide in the materials, no additional precautions need to be taken to ship the materials.

Other embodiments of the present invention include a container that indicates the levels of hydrogen sulfide in the materials within the container. In these embodiments, the container provides a certain indication that the levels of hydrogen sulfide are below toxic amounts and can be transported safely. The container and display can be calibrated according to the relevant regulations to indicate when the hydrogen sulfide level content is below the required levels. This is particularly useful when further analysis on samples from a remote well need further analysis at an off-site location. One of the important aspects of the present invention is its flexibility to be used in multiple scales. Thus, hydrogen sulfide can be removed from smaller volumes of sour water or sour oil by the present invention, such as within a specialized container that indicates that the materials within the container are safe to ship. In another example, the calibration can be set to indicate that no hydrogen sulfide is present, and the oil could be sold to a refinery.

Yet another embodiment of the present invention comprises an indicator that displays a corresponding message or display regarding the amount of hydrogen sulfide content in the materials to be shipped. The indicator can be integrated with a container, or as a stand-alone indicator. The indicator displays information on proper handling of the materials that are to be transported. With the information, decisions on safe handling and safe shipping of the materials can be made. For example, a decision to ship the materials via truck, via parcel, via common carrier, or whether the materials are even safe to transport at all can be made from the information. For instance, if the indicator displays that the hydrogen sulfide level is close to zero, it would indicate safe shipping by any shipment method that would allow the transport of non-hazardous materials similar to those being shipped.

While various embodiments the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

BRIEF DESCRIPTION OF THE DRAWINGS

The accompanying drawings, which are incorporated in and constitute a part of the specification, illustrate embodiments of the invention and, together with the general description of the invention given above and the detailed description of the drawings given below, serve to explain the principals of this invention.

It should be understood that in certain instances, details that are not necessary for an understanding of the disclosure or that render other details difficult to perceive may have been omitted. Further, the drawings of the system and/or method do not detail all features of the system and/or method, and do not show the entire system and/or method. It should be understood, of course, that the disclosure is not necessarily limited to the particular embodiments illustrated herein.

DETAILED DESCRIPTION OF VARIOUS EMBODIMENTS OF THE INVENTION

Figure 1:
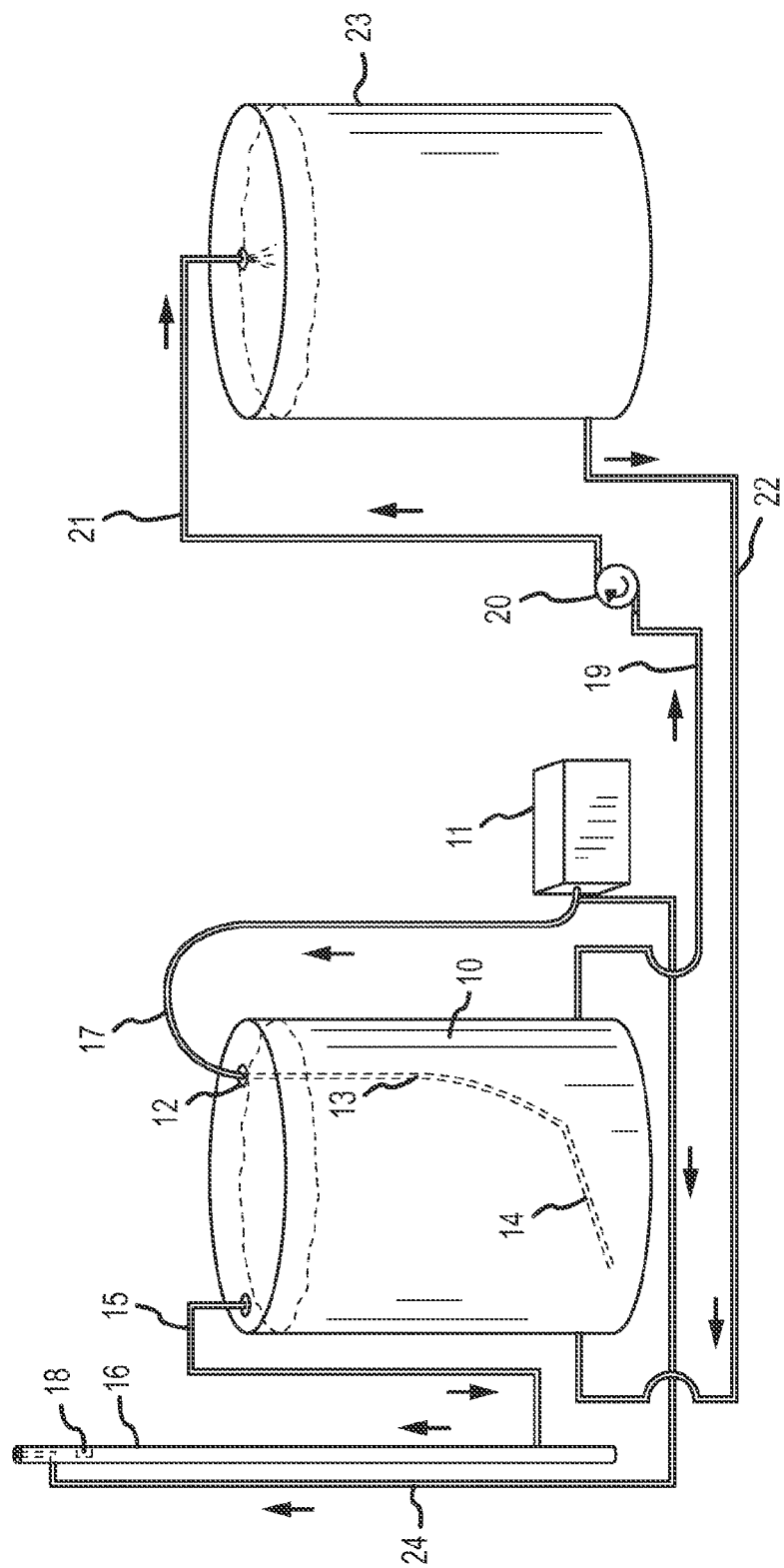
FIG. 1 depicts certain embodiments of the invention to remove hydrogen sulfide from oil and water.

FIG. 1 provides a diagram depicting certain embodiments of the invention related to a system to remove hydrogen sulfide in water and oil. Element 10 is a container comprising sour water. Element 11 is an air compressor used to distribute air to elements 10 and 16. Element 17 is a line from element 11 to distribute air to element 10, sealed by a cap assembly, element 12. Element 13 is a line running from cap assembly element 12 to an air dispenser bar. Element 14 is an air dispenser bar. Element 14 is submerged in the sour water located in element 10. The air in the vapor space is transferred by element 15 to a vent stack, element 16. Element 24 is a second line running from element 11 to element 16, where air from the air compressor dilutes air transferred from the vapor space to the vent stack. Element 18 is a gauge that meters the amount of hydrogen sulfide in element 16.

Element 23 is a container comprising sour oil and water. The oil and water in element 23 are equalized. Element 19 is a line from element 10 to element 20. Element 20 is a pump that distributes lean water from element 10 to element 23. Element 20 pumps the water through element 21, a line running from element 20 to the top of element 23.

As the water is pumped into element 23, it passes through the sour oil due to a lower specific gravity. As the water travels through the sour oil, it obtains hydrogen sulfide from the oil, thus removing hydrogen sulfide from the oil. The water then returns to element 10 through element 22. Element 22 is a line attaching element 23 to element 10. The water runs from element 23 to element 10 via hydrostatic pressure. Hydrogen sulfide is removed from the water that returns from element 23 as described above. Those skilled in the art can appreciate that the particular elements in the embodiment depicted in this figure are connected using typical connections known to those skilled in the art, such as the appropriate seals, caps, clamps, tubes, o-rings, splitter valves, etc. An important aspect of the present invention is that no specialized equipment is necessary, and the items used are those readily available to those skilled in the art.

Figure 2:
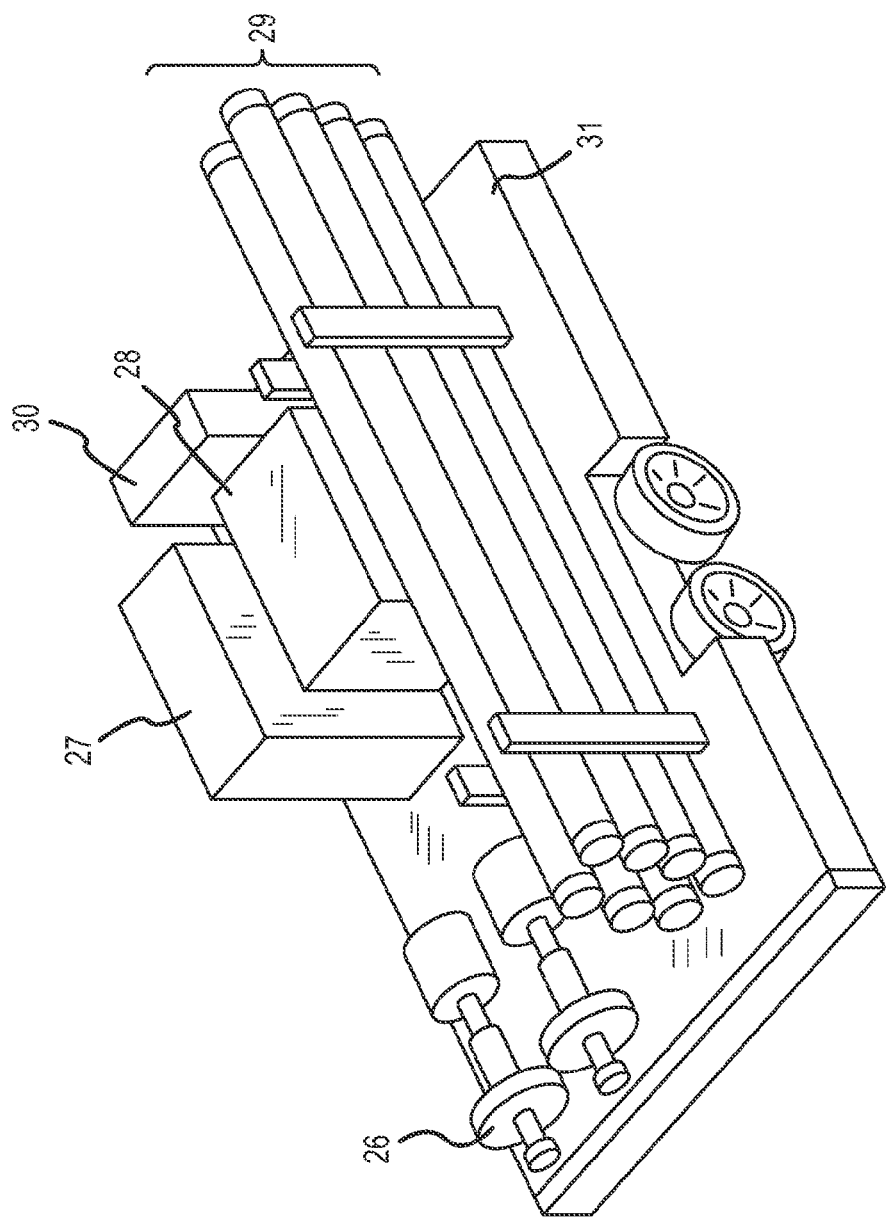
FIG. 2 depicts certain embodiments of the invention that are mobile.

FIG. 2 provides certain embodiments of the invention that are mobile. Element 26 depicts a water pump. Element 27 depicts an automation cabinet. Element 28 depicts an air source. Element 29 depicts a rack where appropriate connections, such as piping or hose can be stored. Element 30 depicts a power source, such as a generator. Element 31 depicts a trailer.

Figure 3:
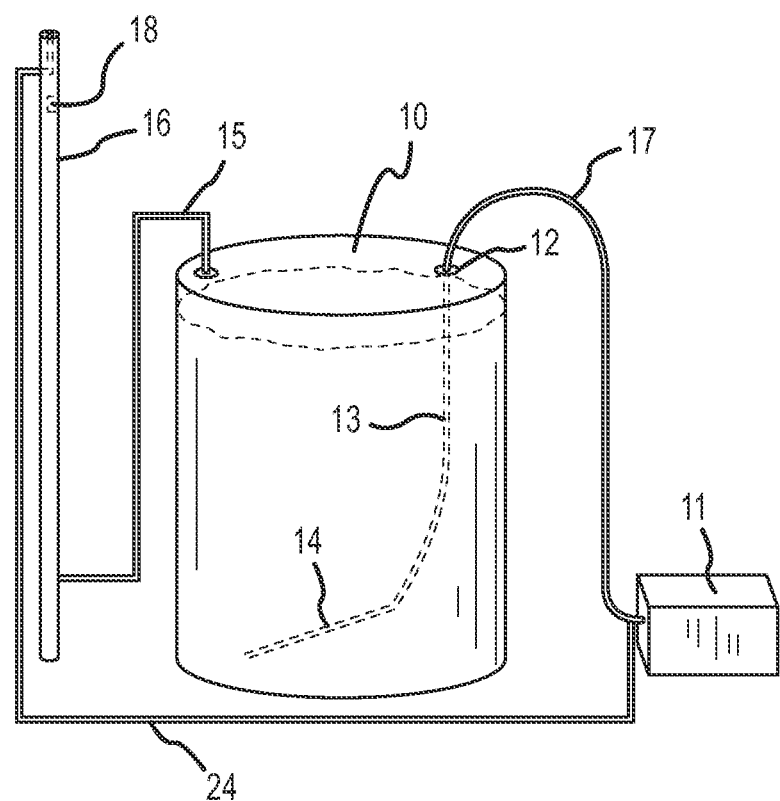
FIG. 3 depicts certain embodiments of the invention to remove hydrogen sulfide from water.

FIG. 3 provides a diagram depicting the system to remove hydrogen sulfide from water. Element 10 is a container comprising sour water. Element 11 is an air compressor used to distribute air to element 10. Element 17 is a line from element 11 to distribute air to element 10, sealed by a cap assembly, element 12. Element 12 is secured to elements 11 and 17 using typical items known to those skilled in the art. Element 13 is a line running from cap assembly element 12 to an air dispenser bar, element 14. Elements 12, 13, and 14 are attached using typical means known to those skilled in the art. Element 14 is submerged in the sour water located in element 10. The air in the vapor space is transferred by element 15 to a vent stack, element 16. Element 24 is a second line running from element 11 to element 16, where air from the air compressor dilutes air transferred from the vapor space to the vent stack. Element 18 is a gauge that meters the amount of hydrogen sulfide concentration in element 16.

Figure 4:
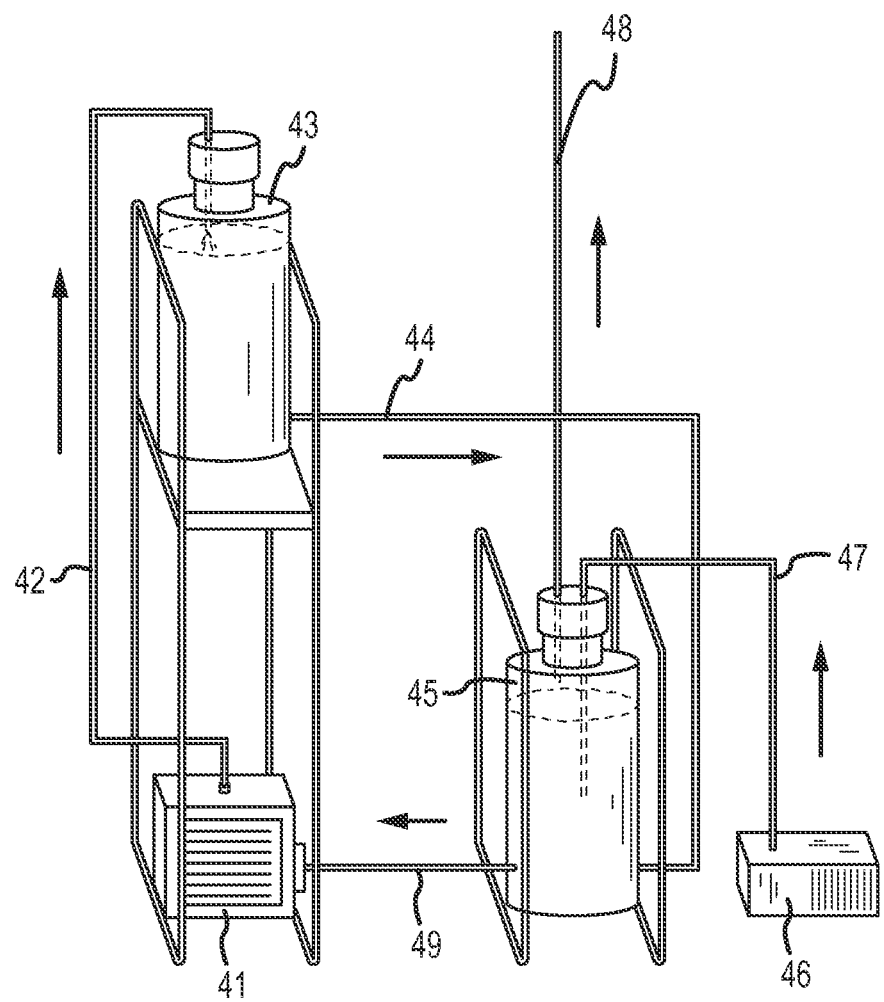
FIG. 4 depicts certain embodiments of the invention that allows removal of hydrogen sulfide in a smaller scale.

FIG. 4 depicts certain embodiments of the invention that allows removal of hydrogen sulfide in a smaller scale. Element 41 depicts a pump. Element 41 is connected to element 45 via element 49. Element 41 pumps water from element 45 through element 42 into element 43. Element 43 is a container filled with sour oil and water. Water from Element 43 flows through element 44 into element 45. Element 45 depicts a container filled with water. Element 46 depicts an air source. Element 46 distributes air through element 47 into element 45. Element 48 depicts a vent connected to element 45.

Figure 5:
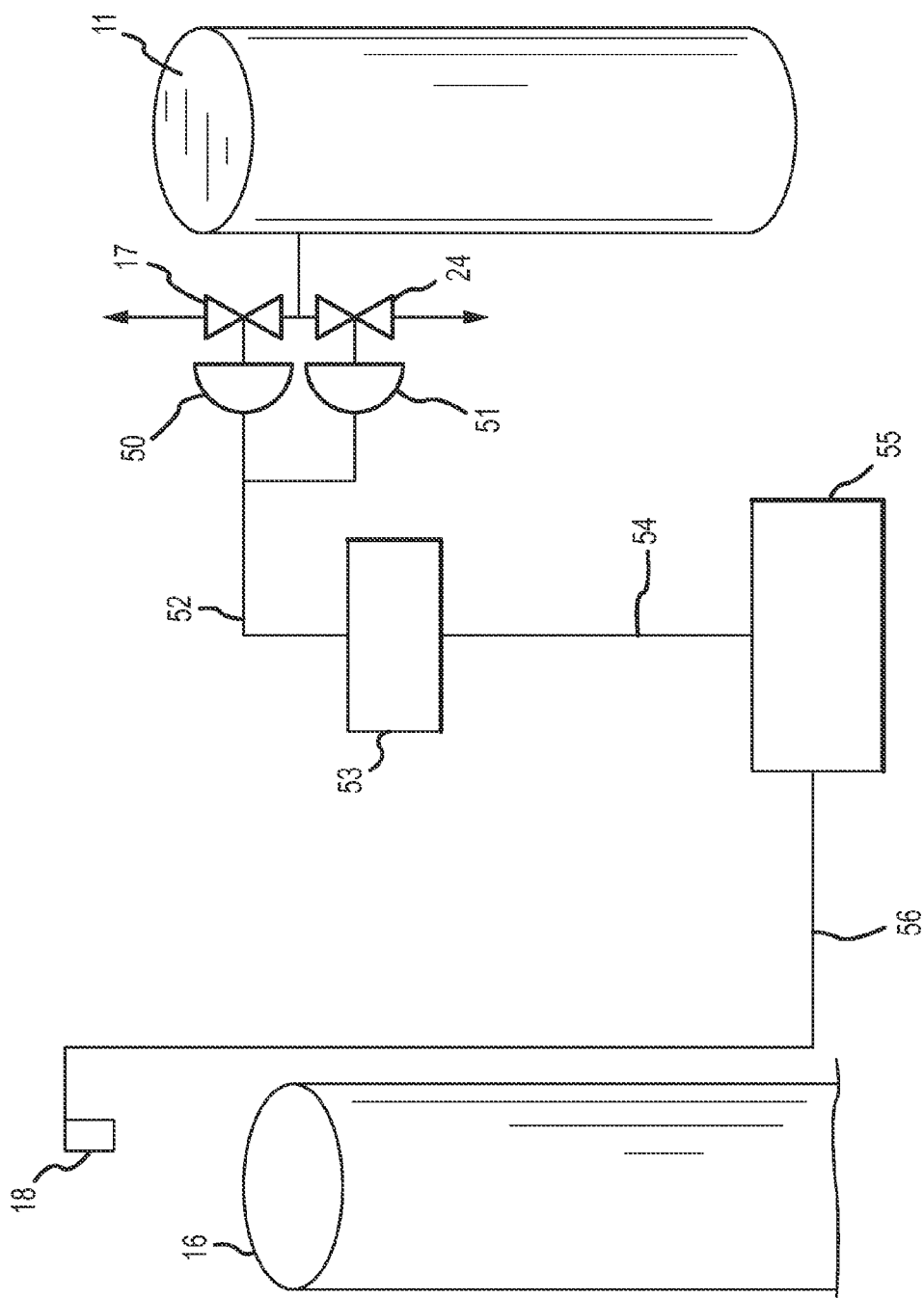
FIG. 5 depicts certain embodiments of the invention comprising a loop controller to regulate air flow.

FIG. 5 provides a diagram depicting certain embodiments of the invention comprising an I to P converter that regulates air flow to a plurality of air lines. Air compressor, element 11 is connected to element 17, a line running air to a tank containing sour water and element 24, a line running air to a vent stack. Element 55 is connected to element 53 by element 54. Element 53 converts an electrical signal from element 55 into a pneumatic signal. The signal from element 53 is relayed by element 52 to elements 50 and 51. Based on the input signal from element 53, element 50 may increase or decrease the amount of air flowing through element 17. Based on the input signal from element 53, element 51 may increase or decrease the amount of air flowing through element 24. Although this diagram depicts a preferred embodiment, other variations to this embodiment, such as using a plurality of I to P converters may be used and is within the spirit of the present invention.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the exemplary claim provided herein.

EXAMPLES

Example 1

To determine tons of sulfur emitted using one embodiment of the invention, a water tank was filled with approximately 350 barrels of sour water, the sour water having a concentration of 10,000 (1%) hydrogen sulfide, as tested through a bottle test described in Example 2, below. Air from an air compressor was distributed into the bottom of the tank at a steady rate of 105 scfm. The air from the vapor space in the tank was then transferred to a vent stack. The amount of hydrogen sulfide and sulfur in the vent stack was measured over a twelve hour period. The measurements were taken around every thirty minutes. The air in the vent stack measured 11.25 scf hydrogen sulfide and 1.01 of sulfur. The airflow into the water tank was kept at a steady 105 scfm and recorded the concentration over time in the vented air. This was approximately 350 barrels of 1% hydrogen sulfide (in tank vapor space tested via bottle test) water. Although air flow was regulated manually in this example, certain aspects of the process could be automated. For example, a PID loop and splitter valve configuration could be used.

Example 2

To determine the amount of hydrogen sulfide present in materials subjected to treatment through certain embodiments of the invention, a "bottle test" was conducted. The bottle test comprises filling a container with 50% of the liquid to be tested, drilling a hole in the top of the container, agitating the container for at least thirty seconds, and measuring the amount of hydrogen sulfide in the vapor space with a hydrogen sulfide meter. In this example, a 1000 ml container was used, but the size of the container is for illustrative purposes only. The 1000 ml container was filled with 500 ml of the liquid to be tested, whether oil or water. A small hole was drilled into the lid of the container. The hole at the top of the container was covered. The container was then agitated by shaking the container for at least 30 seconds. A longer agitation time did not affect the results. After agitation, the vapor space was measured for the amount of hydrogen sulfide. The hydrogen sulfide can be measured with a plunger-type, electronic or similar hydrogen sulfide meters. A bottle test was conducted prior to removing hydrogen sulfide according to the present invention, after removing hydrogen sulfide according to the present invention, and prior to loading the water and/or oil in a truck for transportation. However, a bottle test is not performed if there is any measurable hydrogen sulfide in the air to be vented, as hydrogen sulfide will continue to be removed through the described invention until the concentration of hydrogen sulfide is below the acceptable limits. Acceptable limits can include the levels of hydrogen sulfide allowed by the EPA to be released into the environment, safety limits set by OSHA, and/or other relevant regulations.

After subjecting sour water or sour oil to treatment with the present invention, it was found that the water or oil, when bottle tested, had a reading below 3 ppm hydrogen sulfide in the vapor space, and the liquids themselves had almost no hydrogen sulfide either when tested with hydrogen sulfide test strips.

Example 3 oil from Little Knife Field in North Dakota contained both hydrogen sulfide and sulfur. The pre-process hydrogen sulfide in the vapor space measured at 10.6% or 106,000 ppm. Using a sulfur-in-crude analyzer, the pre-process sulfur by weight measured at 0.66%. After treatment with the present invention, both hydrogen sulfide and sulfur by weight content was reduced, where hydrogen sulfide was reduced to 0% or less than 1 ppm and the process reduced the sulfur by weight to 0.55% by weight.

Example 4 oil from Whitney Canyon Field in Wyoming contained both hydrogen sulfide and sulfur. The pre-process hydrogen sulfide in the vapor space measured at 17.4% or 174,000 ppm. Using a sulfur-in-crude analyzer, the pre-process sulfur by weight measured at 0.84%. After treatment with the present invention, both hydrogen sulfide and sulfur by weight was reduced, where hydrogen sulfide was reduced to 0% or less than 1 ppm and the sulfur by weight was reduced to 0.51% by weight.

What is claimed is:

1. A method for removing hydrogen sulfide from crude oil and water comprising:
    filling a first storage device with water;
    filling a second storage device with crude oil and water in an equalized amount, wherein the crude oil comprises hydrogen sulfide;
    distributing air from a device that can create airflow to said first storage device, using a first connection running from said device creating airflow to said first storage device, wherein the terminal end of said first connection comprises at least one opening;
    transferring air from vapor space located within said first storage device through an enclosed connection to a separate compartment, wherein the separate compartment is capable of mixing air;
    distributing air from said device that can create airflow to said separate compartment, using a second connection running from said device that can create airflow to said separate air mixing compartment;
    measuring the amount of hydrogen sulfide in said separate air storage compartment;
    releasing air from said air storage compartment when the amount of hydrogen sulfide measured is below a desired amount;
    distributing water from said first storage device to said second storage device via a pumping means, wherein the water from said first storage device enters said second storage device through the top of said second storage device;
    measuring the amount of hydrogen sulfide in the crude oil within said second storage device;
    continuing to distribute water from said first storage device to said second storage device until the amount of hydrogen sulfide in the crude oil in said second storage device is below a desired amount;
    returning water from said second storage device to said first storage device;
    continuing to distribute air from said device that can create airflow to said first storage device;
    continuing to transfer air from said vapor space from said first storage device to said separate air mixing compartment; and
    continuing to measure the amount of hydrogen sulfide in said separate air mixing compartment, wherein air is released from said separate air mixing compartment when the amount of hydrogen sulfide measured is below a desired amount, and wherein said method is devoid of any chemical catalysts or chemical scavengers being employed to remove hydrogen sulfide.

2. The method of claim 1 wherein the first storage device is filled with water comprising hydrogen sulfide.

3. A method for removing hydrogen sulfide from crude oil without the use of catalysts or chemical scavengers comprising:
    a) providing a first container adapted to hold crude oil, said first container having an inlet and an outlet;
    b) providing a desired amount of crude oil into said first container at an atmospheric pressure, said crude oil having a first concentration of hydrogen sulfide;

c) contacting the crude oil inside said first container with water entering said first container through said inlet, the water having a first amount of hydrogen sulfide; and d) transferring water out of said first container through said outlet to generate a stream of water, said stream of water having more hydrogen sulfide than said water entering said first container;

e) providing a second container adapted to hold water, wherein said second container further comprises a first inlet, a first outlet, and a second outlet;

f) filling said second container with water to a level sufficient to provide a vapor space at a top surface of the water through said first inlet with water from said outlet of said first container;

g) bubbling air into the water inside said second container;

h) transferring hydrogen sulfide from said vapor space through said first outlet in said second container to form a hydrogen sulfide gas containing stream;

i) providing air to said hydrogen sulfide gas containing stream to generate a second diluted hydrogen sulfide gas containing stream; and j) transferring water from said second container through said second outlet and into the inlet of said first container; wherein said method is devoid of any chemical catalysts or chemical scavengers being employed to remove hydrogen sulfide.

4. The method of claim 3 wherein after said transferring step, the crude oil in said first container has a reduced concentration of hydrogen sulfide as compared to said first concentration.

5. The method of claim 3 further comprising maintaining the pH of said water at 7.0 or below.

6. The method of claim 3 further comprising performing said method at a temperature of at least 45 degrees Fahrenheit.

7. The method of claim 3 further comprising measuring the amount of hydrogen sulfide present in said crude oil after said contacting step c).

8. The method of claim 3 where the contacting step c) is performed at a rate from 20 gallons per minute to 126 gallons per minute.

9. The method of claim 3 further comprising repeating step c) until the amount of hydrogen sulfide in said crude oil is reduced to an amount below 100 parts per million.

10. The method of claim 3 further comprising releasing into the ambient environment the second diluted hydrogen sulfide gas containing stream when the concentration of hydrogen sulfide present in said second diluted hydrogen gas containing stream is below a predetermined level.

11. The method of claim 3 wherein step j) of transferring is conducted at a rate from 20 gallons per minute to 126 gallons per minute.

12. The method of claim 3 wherein step g) of bubbling is conducted at a rate of at least 105 standard cubic feet per minute.

13. The method of claim 3 wherein contacting said crude oil with water further comprises agitating said crude oil.

14. The method of claim 3 further comprising measuring the concentration of hydrogen sulfide present in the second diluted hydrogen sulfide gas containing stream and releasing into the ambient environment the second diluted hydrogen sulfide gas containing stream when the concentration of hydrogen sulfide is measured below a predetermined level.

15. The method of claim 3 further comprising repeating steps c-j until the concentration of hydrogen sulfide in said crude oil is reduced to 100 parts per million or below.

16. The method of claim 15 further comprising repeating steps h-i until the concentration of hydrogen sulfide present in said second diluted hydrogen sulfide containing stream is below a predetermined level.

17. The method of claim 16 further comprising maintaining the pH of said water at 7.0 or below.

18. The method of claim 17 further comprising performing said method at a temperature of at least 45 degrees Fahrenheit.

19. A method for removing hydrogen sulfide from crude oil and water comprising:

a) providing a first container adapted to hold water, said first container comprising an aperture, an inlet, and an outlet;

b) providing said first container with water sufficient to provide a vapor space between a top surface of the water and said aperture, wherein said water has a pH of 7.0 or below;

c) providing a second container, said second container adapted to hold crude oil, and having an inlet and an outlet and having an atmospheric pressure;

d) providing said second container with an amount of sour crude oil, wherein said sour crude oil has not been treated by a treatment selected from the group consisting of: hydrotreatment, chemical scavenger treatment, and chemical catalyst treatment;

e) bubbling air through the water contained within said first container to produce a first mixed air faction in said vapor space;

f) transferring said first mixed air faction from said first vapor space through said aperture to a mixing air station to produce a second mixed air faction;

g) providing air to said mixing air station;

h) releasing air from said mixing air station when the concentration of hydrogen sulfide present in said second mixed air faction is below a predetermined amount;

i) conveying water from said first container to said second container at a rate from 20 gallons per minute to 126 gallons per minute, whereby said water strips hydrogen sulfide from said crude oil as the water contacts said crude oil, generating a stream of sour water;

j) conveying said sour water through said outlet of said second container and into said first container;

k) repeating step i) until the amount of hydrogen sulfide in said sour crude oil is reduced to a predetermined level; and l) repeating steps e-h until the concentration of hydrogen sulfide from the water conveyed to said first container is reduced to a predetermined level.

20. A method for removing hydrogen sulfide from crude oil and water comprising:

filling a first storage device with water;

filling a second storage device with crude oil and water in an equalized amount, wherein the crude oil comprises hydrogen sulfide;

distributing air from a device that can create airflow to said first storage device, using a first connection running from said device creating airflow to said first storage device, wherein the terminal end of said first connection comprises at least one opening;

transferring air from vapor space located within said first storage device through an enclosed connection to a separate compartment, wherein the separate compartment is capable of mixing air;

distributing air from said device that can create airflow to said separate compartment, using a second connection running from said device that can create airflow to said separate air mixing compartment;

measuring the amount of hydrogen sulfide in said separate air storage compartment;

releasing air from said air storage compartment when the amount of hydrogen sulfide measured is below a desired amount;

distributing water from said first storage device to said second storage device via a pumping means, wherein the water from said first storage device enters said second storage device through the top of said second storage device;

measuring the amount of hydrogen sulfide in the crude oil within said second storage device;

continuing to distribute water from said first storage device to said second storage device until the amount of hydrogen sulfide in the crude oil in said second storage device is below a desired amount;

returning water from said second storage device to said first storage device;

continuing to distribute air from said device that can create airflow to said first storage device;

continuing to transfer air from said vapor space from said first storage device to said separate air mixing compartment; and continuing to measure the amount of hydrogen sulfide in said separate air mixing compartment, wherein air is released from said separate air mixing compartment when the amount of hydrogen sulfide measured is below a desired amount.

21. The method of claim 20 wherein the water is fresh water.

22. The method of claim 1 wherein the water is fresh water.

* * * * *